(12) United States Patent
Shih

(10) Patent No.: US 9,939,615 B2
(45) Date of Patent: Apr. 10, 2018

(54) OPTICAL LENS ASSEMBLY

(71) Applicants: Sintai Optical (Shenzhen) Co., Ltd., Shenzhen, Guandong Province (CN); AO Ether Corporation, Taichung (TW)

(72) Inventor: Po-Yuan Shih, Taichung (TW)

(73) Assignees: SINTAI OPTICAL (SHENZHEN) CO., LTD., Shenzhen, Guangdong Province (CN); AO ETHER CORPORATION, Taichung (TW)

( * ) Notice: Subject to any disclaimer, the term of this patent is extended or adjusted under 35 U.S.C. 154(b) by 0 days.

(21) Appl. No.: 15/191,559

(22) Filed: Jun. 24, 2016

(65) Prior Publication Data

US 2016/0377840 A1    Dec. 29, 2016

(30) Foreign Application Priority Data

Jun. 29, 2015 (CN) .......................... 2015 1 0368520

(51) Int. Cl.
| | | |
|---|---|---|
| *G02B 9/62* | (2006.01) | |
| *G02B 13/18* | (2006.01) | |
| *G02B 13/00* | (2006.01) | |
| *G02B 27/00* | (2006.01) | |

(52) U.S. Cl.
CPC .......... *G02B 13/0045* (2013.01); *G02B 9/62* (2013.01); *G02B 27/0025* (2013.01); *G02B 27/0081* (2013.01)

(58) Field of Classification Search
CPC .............................. G02B 13/0045; G02B 9/62
USPC .................................. 359/713, 752, 756, 757
See application file for complete search history.

(56) References Cited

U.S. PATENT DOCUMENTS

| | | | | |
|---|---|---|---|---|
| 2013/0335834 A1* | 12/2013 | Tsai | ................... | G02B 13/0045 359/713 |
| 2015/0103414 A1* | 4/2015 | Baik | ........................ | G02B 9/64 359/708 |
| 2016/0004040 A1* | 1/2016 | Chen | ................... | G02B 13/0045 359/713 |
| 2017/0357081 A1* | 12/2017 | Dai | .......................... | G02B 9/64 |

* cited by examiner

*Primary Examiner* — William Choi
(74) *Attorney, Agent, or Firm* — McClure, Qualey & Rodack, LLP

(57) ABSTRACT

An optical lens assembly includes a first lens, a second lens, a third lens, a fourth lens, a fifth lens and a sixth lens, all of which are arranged in sequence from an object side to an image side along an optical axis. The first lens is with positive refractive power and includes a convex surface facing the object side. The second lens is with refractive power. The third lens is with refractive power. The fourth lens is a meniscus lens with refractive power. The fifth lens is with positive refractive power. The sixth lens is with positive refractive power. The optical lens assembly satisfies: $-1.8 \leq f_4/f \leq -1.3$ wherein $f_4$ is an effective focal length of the fourth lens and f is an effective focal length of the optical lens assembly.

18 Claims, 28 Drawing Sheets

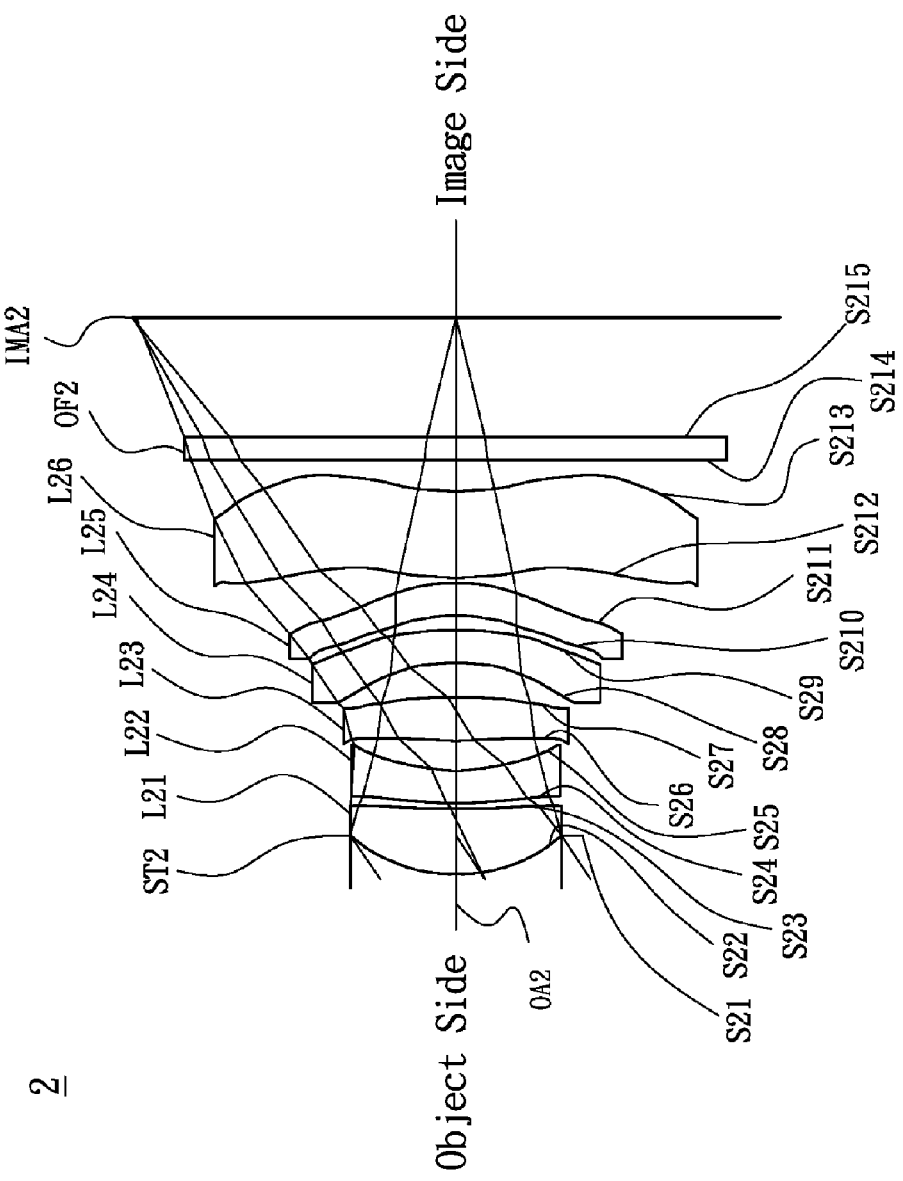

OPTICAL LENS ASSEMBLY

BACKGROUND OF THE INVENTION

Field of the Invention

The invention relates to an optical lens assembly.

Description of the Related Art

Digital still cameras and mobile phones have been continually developed toward high pixel number and miniaturization. Therefore, the requirements for optical lens assemblies with miniaturization and high resolution are greatly increased. The well-known optical lens assembly with five lenses can't satisfy requirements of present. Therefore, an optical lens assembly needs a new structure in order to meet the requirements of miniaturization and high resolution.

BRIEF SUMMARY OF THE INVENTION

The invention provides an optical lens assembly to solve the above problems. The optical lens assembly of the invention, provided with characteristics of a shortened total lens length, an increased field of view, still has a good optical performance and can meet a requirement of resolution.

The optical lens assembly in accordance with an exemplary embodiment of the invention includes a first lens, a second lens, a third lens, a fourth lens, a fifth lens and a sixth lens, all of which are arranged in sequence from an object side to an image side along an optical axis. The first lens is with positive refractive power and includes a convex surface facing the object side. The second lens is with refractive power. The third lens is with refractive power. The fourth lens is a meniscus lens with refractive power. The fifth lens is with positive refractive power. The sixth lens is with positive refractive power. The optical lens assembly satisfies $-1.8 \leq f_4/f \leq -1.3$, wherein $f_4$ is an effective focal length of the fourth lens and f is an effective focal length of the optical lens assembly.

In another exemplary embodiment, the fourth lens is a meniscus lens with negative refractive power and includes a concave surface facing the object side and a convex surface facing the image side.

In yet another exemplary embodiment, the sixth lens satisfies $3 \leq f_6/f \leq 5$, wherein $f_6$ is an effective focal length of the sixth lens and f is an effective focal length of the optical lens assembly.

In another exemplary embodiment, the first lens satisfies $-1.5 \leq (R_{11}-R_{12})/(R_{11}+R_{12}) \leq -0.5$, wherein $R_{11}$ is a radius of curvature of the convex surface of the first lens and $R_{12}$ is a radius of curvature of an image side surface of the first lens.

In yet another exemplary embodiment, the second lens satisfies $0.2 \leq (R_{21}-R_{22})/(R_{21}+R_{22}) \leq 0.4$, wherein $R_{21}$ is a radius of curvature of an object side surface of the second lens and $R_{22}$ is a radius of curvature of an image side surface of the second lens.

In another exemplary embodiment, the fifth lens satisfies $5 \leq f_5/f \leq 100$, wherein $f_5$ is an effective focal length of the fifth lens and f is an effective focal length of the optical lens assembly.

In yet another exemplary embodiment, the third lens satisfies $-100 \leq (R_{31}-R_{32})/(R_{31}+R_{32}) \leq 2$, wherein $R_{31}$ is a radius of curvature of an object side surface of the third lens and $R_{32}$ is a radius of curvature of an image side surface of the third lens.

In another exemplary embodiment, the optical lens assembly satisfies $0.69 \leq f/TTL \leq 0.85$, wherein f is an effective focal length of the optical lens assembly and TTL is an interval from the convex surface of the first lens to an image plan along the optical axis.

In yet another exemplary embodiment, the second lens is a meniscus lens with negative refractive power and includes a convex surface facing the object side and a concave surface facing the image side.

In another exemplary embodiment, the third lens is with positive refractive power and includes a convex surface facing the image side.

In yet another exemplary embodiment, the sixth lens is a meniscus lens and includes a convex surface facing the object side and a concave surface facing the image side.

In another exemplary embodiment, the first lens further includes a surface and the surface is an aspheric surface, or the convex surface of the first lens is an aspheric surface, or both of the surface and the convex surface of the first lens are aspheric surfaces.

In yet another exemplary embodiment, the second lens further includes two surfaces, at least one of which is an aspheric surface or both of which are aspheric surfaces.

In another exemplary embodiment, the third lens further includes two surfaces, at least one of which is an aspheric surface or both of which are aspheric surfaces.

In yet another exemplary embodiment, the fourth lens further includes two surfaces, at least one of which is an aspheric surface or both of which are aspheric surfaces.

In another exemplary embodiment, the fifth lens further includes two surfaces, at least one of which is an aspheric surface or both of which are aspheric surfaces.

In yet another exemplary embodiment, the sixth lens further includes two surfaces, at least one of which is an aspheric surface or both of which are aspheric surfaces.

In another exemplary embodiment, the optical lens assembly further includes a stop disposed between the object side and the first lens.

In yet another exemplary embodiment, the fourth lens is a meniscus lens with positive refractive power and includes a concave surface facing the object side and a convex surface facing the image side.

In another exemplary embodiment, a range of field of view satisfies: $65° \leq$ field of view $\leq 75°$.

The optical lens assembly in accordance with an another exemplary embodiment of the invention includes a first lens, a second lens, a third lens, a fourth lens, a fifth lens and a sixth lens, all of which are arranged in sequence from an object side to an image side along an optical axis. The first lens is with positive refractive power and includes a convex surface facing the object side. The second lens is a meniscus lens with negative refractive power and includes a convex surface facing the object side and a concave surface facing the image side. The third lens is with positive refractive power and includes a convex surface facing the image side. The fourth lens is a meniscus lens and includes a concave surface facing the object side and a convex surface facing the image side. The fifth lens is a meniscus lens with positive refractive power and includes a concave surface facing the object side and a convex surface facing the image side. The sixth lens is a meniscus lens with positive refractive power and includes a convex surface facing the object side and a concave surface facing the image side. The optical lens assembly satisfies $0.69 \leq f/TTL \leq 0.85$, $11.5 \leq f_5/f \leq 26.5$, $0 \leq (R_{31}-R_{32})/(R_{31}+R_{32}) \leq 1$, wherein f is an effective focal length of the optical lens assembly, TTL is an interval from the convex surface of the first lens to an image plane along the optical axis, $f_5$ is an effective focal length of the fifth lens, $R_{31}$ is a radius of curvature of an object side surface of the third lens and $R_{32}$ is a radius of curvature of the convex surface of the third lens.

The optical lens assembly in accordance with an another exemplary embodiment of the invention includes a first lens, a second lens, a third lens, a fourth lens, a fifth lens and a sixth lens, all of which are arranged in sequence from an object side to an image side along an optical axis. The first lens is with positive refractive power and includes a convex surface facing the object side. The second lens is with refractive power. The third lens is with refractive power. The fourth lens is with refractive power. The fifth lens is with positive refractive power. The sixth lens is with positive refractive power. The optical lens assembly satisfies $10 \leq f_4/f \leq 25$, wherein $f_4$ is an effective focal length of the fourth lens and f is an effective focal length of the optical lens assembly.

In yet another exemplary embodiment, a range of field of view satisfies: $75° \leq$ field of view $\leq 85°$.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3 is a lens layout and optical path diagram of an optical lens assembly in accordance with a second embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
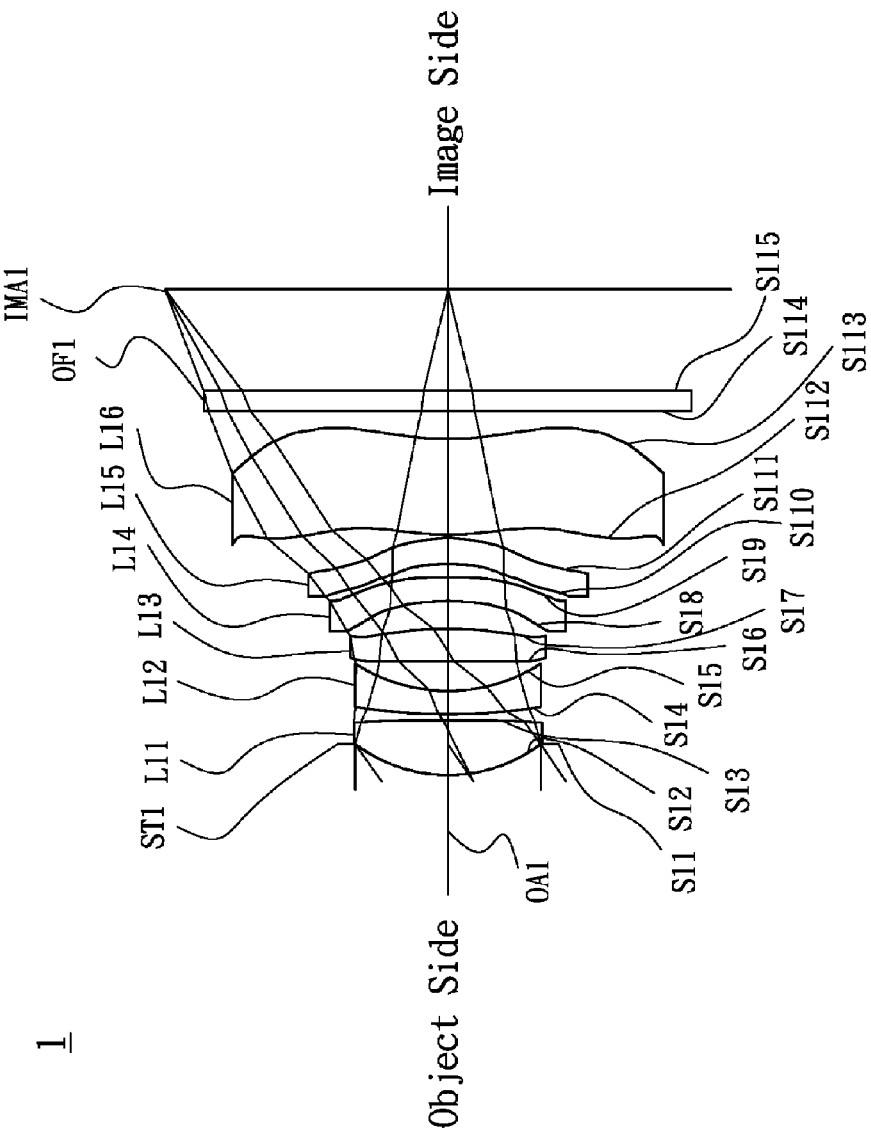
FIG. 1 is a lens layout and optical path diagram of an optical lens assembly in accordance with a first embodiment of the invention.

Referring to FIG. 1, FIG. 1 is a lens layout and optical path diagram of an optical lens assembly in accordance with a first embodiment of the invention. The optical lens assembly 1 includes a stop ST1, a first lens L11, a second lens L12, a third lens L13, a fourth lens L14, a fifth lens L15, a sixth lens L16 and an optical filter OF1, all of which are arranged in sequence from an object side to an image side along an optical axis OA1. In operation, an image of light rays from the object side is formed at an image plane IMA1. The first lens L11 is with positive refractive power and made of plastic material, wherein the object side surface S12 is a convex surface, the image side surface S13 is a convex surface and both of the object side surface S12 and image side surface S13 are aspheric surfaces. The second lens L12 is with negative refractive power and made of plastic material, wherein the object side surface S14 is a convex surface, the image side surface S15 is a concave surface and both of the object side surface S14 and image side surface S15 are aspheric surfaces. The third lens L13 is with positive refractive power and made of plastic material, wherein the object side surface S16 is a convex surface, the image side surface S17 is a convex surface and both of the object side surface S16 and image side surface S17 are aspheric surfaces. The fourth lens L14 is with negative refractive power and made of plastic material, wherein the object side surface S18 is a concave surface, the image side surface S19 is a convex surface and both of the object side surface S18 and image side surface S19 are aspheric surfaces. The fifth lens L15 is with positive refractive power and made of plastic material, wherein the object side surface S110 is a concave surface, the image side surface S111 is a convex surface and both of the object side surface S110 and image side surface S111 are aspheric surfaces. The sixth lens L16 is with positive refractive power and made of plastic material, wherein the object side surface S112 is a convex surface, the image side surface S113 is a concave surface and both of the object side surface S112 and image side surface S113 are aspheric surfaces. Both of the object side surface S114 and image side surface S115 of the optical filter OF1 are plane surfaces.

In order to maintain excellent optical performance of the optical lens assembly in accordance with the first embodiment of the invention, the optical lens assembly 1 must satisfies the following seven conditions:

$$-1.8 \leq fl_4/fl \leq -1.3 \quad (1)$$

$$5 \leq fl_5/fl \leq 100 \quad (2)$$

$$0.69 \leq fl/TTL1 \leq 0.85 \quad (3)$$

$$-1.5 \leq (R1_{11}-R1_{12})/(R1_{11}+R1_{12}) \leq -0.5 \quad (4)$$

$$0.2 \leq (R1_{21}-R1_{22})/(R1_{31}+R1_{32}) \leq 0.4 \quad (5)$$

$$-100 \leq (R1_{31}-R1_{32})/(R1_{31}+R1_{32}) \leq 2 \quad (6)$$

$$3 \leq fl_6/fl_5 \quad (7)$$

wherein $fl_4$ is an effective focal length of the fourth lens L14, $fl$ is an effective focal length of the optical lens assembly 1, $fl_5$ is an effective focal length of the fifth lens L15, TTL1 is an interval from the object side surface S12 of the first lens L11 to the image plane IMA1 along the optical axis OA1, $R1_{11}$ is a radius of curvature of the object side surface S12 of the first lens L11, $R1_{12}$ is a radius of curvature of the image side surface S13 of the first lens L11, $R1_{21}$ is a radius of curvature of the object side surface S14 of the second lens L12, $R1_{22}$ is a radius of curvature of the image side surface S15 of the second lens L12, $R1_{31}$ is a radius of curvature of the object side surface S16 of the third lens L13, $R1_{32}$ is a radius of curvature of the image side surface S17 of the third lens L13, and $fl_6$ is an effective focal length of the sixth lens L16.

By the above design of the lenses and stop ST1, the optical lens assembly 1 is provided with a shortened total lens length, an increased field of view, an effective corrected aberration and an increased resolution.

In order to achieve the above purposes and effectively enhance the optical performance, the optical lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens. Table 1 shows that the effective focal length is equal to 4.2304 mm, F-number is equal to 2.2, field of view is equal to 68.5° and total lens length is equal to 5.074 mm for the optical lens assembly 1 of the first embodiment of the invention.

TABLE 1

Effective Focal Length = 4.2304 mm
F-number = 2.2
Field of View = 68.5°
Total Lens Length = 5.074 mm

| Surface Number | Radius of Curvature (mm) | Thickness (mm) | Nd | Vd | Remark |
|---|---|---|---|---|---|
| S11 | ∞ | −0.319 | | | Stop ST1 |
| S12 | 1.609 | 0.577 | 1.535 | 55.7 | The First Lens L11 |
| S13 | −23.114 | 0.055 | | | |
| S14 | 2.920 | 0.250 | 1.636 | 23.9 | The Second Lens L12 |
| S15 | 1.354 | 0.302 | | | |
| S16 | 20.573 | 0.341 | 1.535 | 55.7 | The Third Lens L13 |
| S17 | −4.652 | 0.294 | | | |
| S18 | −2.455 | 0.250 | 1.535 | 55.7 | The Fourth Lens L14 |
| S19 | −6.911 | 0.141 | | | |
| S110 | −1.311 | 0.270 | 1.636 | 23.9 | The Fifth Lens L15 |
| S111 | −1.361 | 0.030 | | | |
| S112 | 2.355 | 1.000 | 1.535 | 55.7 | The Sixth Lens L16 |
| S113 | 2.589 | 0.293 | | | |
| S114 | ∞ | 0.210 | 1.517 | 64.2 | Optical Filter OF1 |
| S115 | ∞ | 1.063 | | | |

The aspheric surface sag z of each lens in table 1 can be calculated by the following formula:

$$z = ch^2/\{1+[1-(k+1)c^2h^2]^{1/2}\} + Ah^4 \pm Bh^6 + Ch^8 + Dh^{10} + Eh^{12} \pm Fh^{14} \pm Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | S12 | S13 | S14 | S15 | S16 | S17 |
|---|---|---|---|---|---|---|
| k | −2.0993E−02 | 0.0000E+00 | −3.8993E+01 | −5.4696E+00 | 0.0000E+00 | −5.5276E+01 |
| A | 4.5300E−03 | −3.0765E−02 | −6.1571E−02 | 9.9413E−03 | −9.1727E−03 | −3.0678E−02 |
| B | 1.9758E−02 | 1.4259E−01 | 7.9731E−02 | 2.1949E−02 | −4.8493E−02 | −6.3997E−02 |
| C | −3.9933E−02 | −1.6110E−01 | 4.6862E−02 | 1.5909E−01 | 3.3321E−03 | 2.7850E−02 |
| D | −1.0934E−02 | 2.6561E−02 | −1.6832E−01 | −2.9736E−01 | 6.9332E−02 | 1.2766E−02 |
| E | 9.0967E−02 | 5.4173E−02 | 5.7237E−02 | 1.8063E−01 | 6.5978E−03 | 3.2965E−02 |
| F | −6.6853E−02 | −4.3766E−02 | 1.8332E−02 | −1.7565E−02 | −6.1173E−03 | 1.3085E−02 |

TABLE 2-continued

| Surface Number | S18 | S19 | S110 | S111 | S112 | S113 |
|---|---|---|---|---|---|---|
| k | 0.0000E+00 | 1.7864E+01 | −6.3356E+00 | −6.8591E−01 | −5.1389E+00 | −4.5850E+00 |
| A | −5.2358E−02 | −1.5021E−01 | −4.2216E−02 | 1.1267E−01 | −1.6973E−01 | −8.4558E−02 |
| B | −1.0926E−01 | −2.4979E−03 | −2.3669E−02 | −3.7552E−02 | 9.2199E−02 | 3.0662E−02 |
| C | 7.4593E−02 | 3.0604E−02 | 1.0041E−01 | 2.9116E−02 | −6.5655E−02 | −1.3645E−02 |
| D | −3.3805E−02 | 3.1164E−02 | −4.8129E−02 | 8.9581E−03 | 3.8567E−02 | 4.4273E−03 |
| E | 3.5276E−02 | −1.2319E−02 | −1.5718E−04 | −4.7844E−03 | −1.2220E−02 | −9.1078E−04 |
| F | 6.3378E−02 | −1.5182E−03 | 5.2758E−03 | −3.7455E−03 | 1.9055E−03 | 1.0201E−04 |
| G | −5.4731E−02 | −9.6178E−05 | −1.6450E−03 | 1.2883E−03 | −1.1639E−04 | −4.5544E−06 |

For the optical lens assembly 1 of the first embodiment, the effective focal length $fl_4$ of the fourth lens L14 is equal to −7.2589 mm, the effective focal length fl of the optical lens assembly 1 is equal to 4.2304 mm, the effective focal length $fl_5$ of the fifth lens L15 is equal to 51.08960 mm, the interval TTL1 from the object side surface S12 of the first lens L11 to the image plane IMA1 along the optical axis OA1 is equal to 5.074 mm, the radius of curvature $R1_{11}$ of the object side surface S12 of the first lens L11 is equal to 1.60893 mm, the radius of curvature $R1_{12}$ of the image side surface S13 of the first lens L11 is equal to −23.11372 mm, the radius of curvature $R1_{21}$ of the object side surface S14 of the second lens L12 is equal to 2.92011 mm, the radius of curvature $R1_{22}$ of the image side surface S15 of the second lens L12 is equal to 1.35420 mm, the radius of curvature $R1_{31}$ of the object side surface S16 of the third lens L13 is equal to 20.57349 mm, the radius of curvature $R1_{32}$ of the image side surface S17 of the second lens L13 is equal to −4.65176 mm and the effective focal length $fl_6$ of the sixth lens L16 is equal to 19.54329 mm. According to the above data, the following values can be obtained:

$$fl_4/fl=-1.7159,$$

$$fl_5/fl=12.0768,$$

$$fl/TTL1=0.8337,$$

$$(R1_{11}-R1_{12})/(R1_{11}+R1_{12})=-1.1496,$$

$$(R1_{21}-R1_{22})/(R1_{21}+R1_{22})=0.3664,$$

$$(R1_{31}-R1_{32})/(R1_{31}+R1_{32})=1.5843,$$

$$fl_6/fl=4.6197$$

which respectively satisfy the above conditions (1)-(7).

Figure 2A:
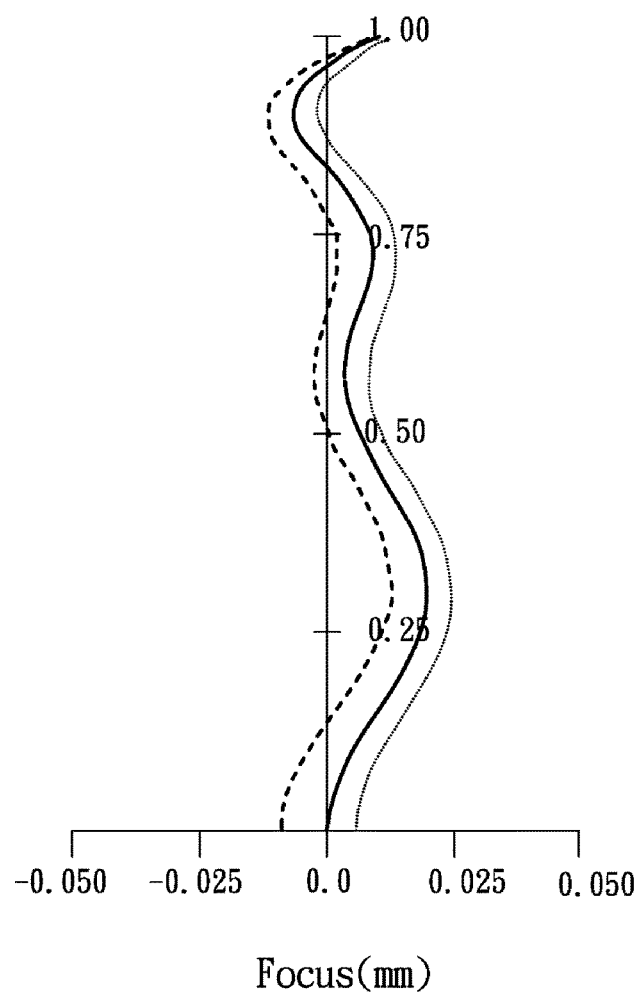
FIG. 2A depicts a longitudinal spherical aberration of the optical lens assembly in accordance with the first embodiment of the invention.
Figure 2B:
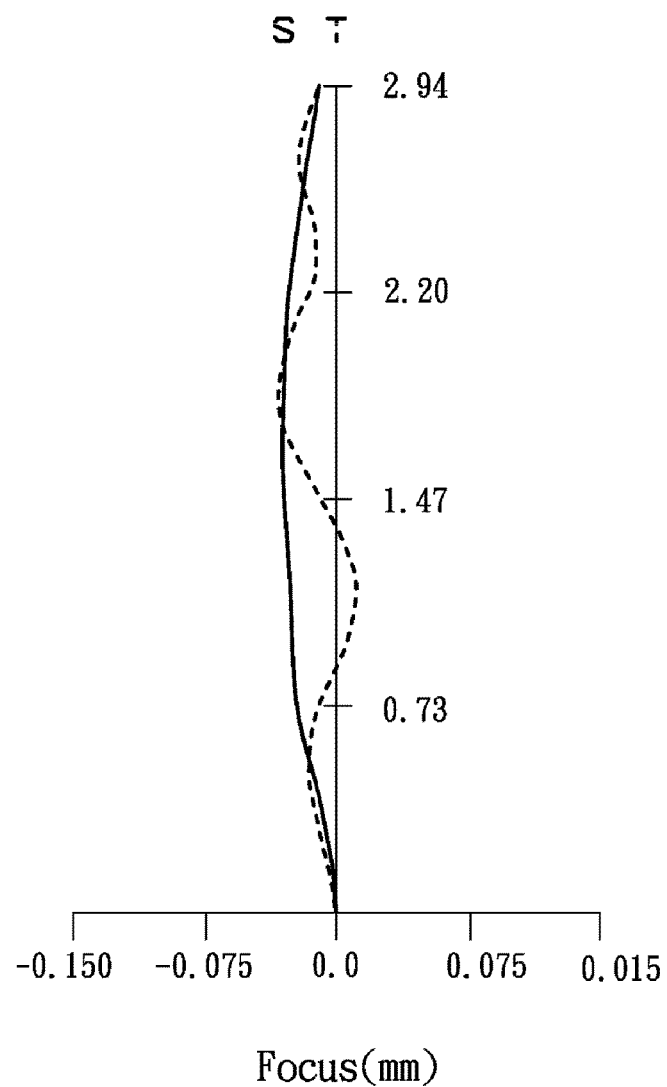
FIG. 2B is an astigmatic field curves diagram of the optical lens assembly in accordance with the first embodiment of the invention.
Figure 2C:
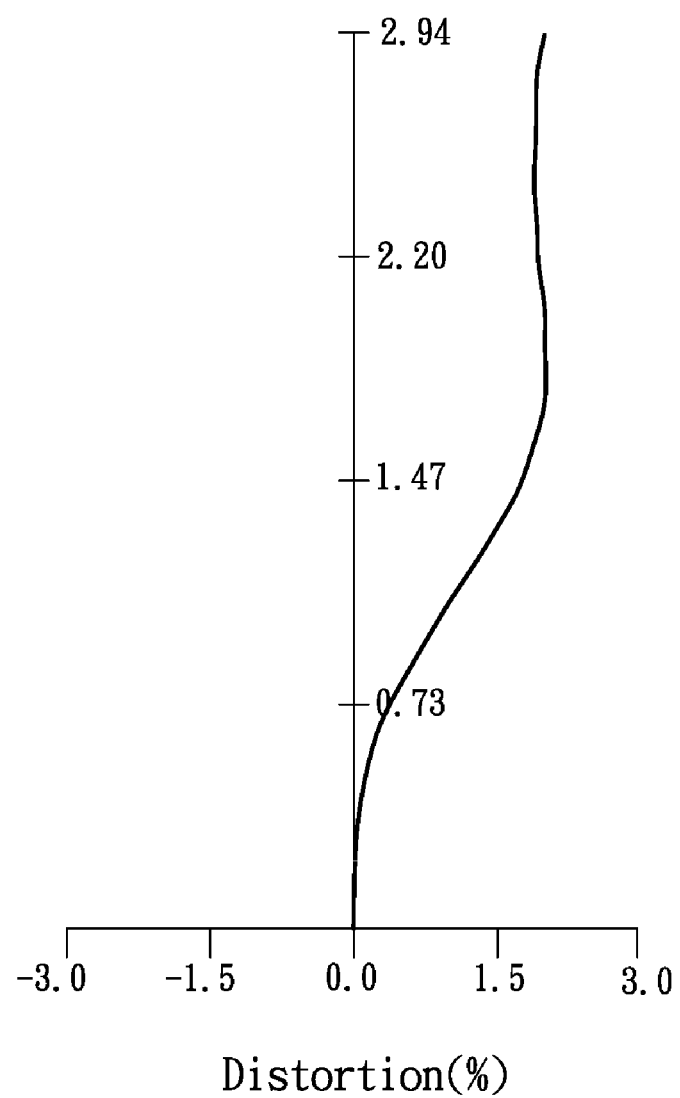
FIG. 2C is a distortion diagram of the optical lens assembly in accordance with the first embodiment of the invention.

By the above arrangements of the lenses and stop ST1, the optical lens assembly 1 of the first embodiment can meet the requirements of optical performance as seen in FIGS. 2A-2C, wherein FIG. 2A shows a longitudinal spherical aberration diagram of the optical lens assembly 1 in accordance with the first embodiment of the invention, FIG. 2B shows an astigmatic field curves of the optical lens assembly 1 in accordance with the first embodiment of the invention and FIG. 2C shows a distortion diagram of the optical lens assembly 1 in accordance with the first embodiment of the invention.

It can be seen from FIG. 2A that the longitudinal spherical aberration in the optical lens assembly 1 of the first embodiment ranges from −0.013 mm to 0.025 mm for the wavelength of 486.1300 nm, 587.5600 nm and 656.2800 nm. It can be seen from FIG. 2B that the astigmatic field curves of tangential direction and sagittal direction in the optical lens assembly 1 of the first embodiment ranges from −0.038 mm to 0.013 mm for the wavelength of 587.5600 nm. It can be seen from FIG. 2C that the distortion in the optical lens assembly 1 of the first embodiment ranges from 0% to 2.3% for the wavelength of 587.5600 nm. It is obvious that the longitudinal spherical aberration, the astigmatic field curves and the distortion of the optical lens assembly 1 of the first embodiment can be corrected effectively. Therefore, the optical lens assembly 1 of the first embodiment is capable of good optical performance.

Referring to FIG. 3, FIG. 3 is a lens layout and optical path diagram of an optical lens assembly in accordance with a second embodiment of the invention. The optical lens assembly 2 includes a stop ST2, a first lens L21, a second lens L22, a third lens L23, a fourth lens L24, a fifth lens L25, a sixth lens L26 and an optical filter OF2, all of which are arranged in sequence from an object side to an image side along an optical axis OA2. In operation, an image of light rays from the object side is formed at an image plane IMA2. The first lens L21 is with positive refractive power and made of plastic material, wherein the object side surface S22 is a convex surface, the image side surface S23 is a concave surface and both of the object side surface S22 and image side surface S23 are aspheric surfaces. The second lens L22 is with negative refractive power and made of plastic material, wherein the object side surface S24 is a convex surface, the image side surface S25 is a concave surface and both of the object side surface S24 and image side surface S25 are aspheric surfaces. The third lens L23 is with positive refractive power and made of plastic material, wherein the object side surface S26 is a convex surface, the image side surface S27 is a convex surface and both of the object side surface S26 and image side surface S27 are aspheric surfaces. The fourth lens L24 is with negative refractive power and made of plastic material, wherein the object side surface S28 is a concave surface, the image side surface S29 is a convex surface and both of the object side surface S28 and image side surface S29 are aspheric surfaces. The fifth lens L25 is with positive refractive power and made of plastic material, wherein the object side surface S210 is a concave surface, the image side surface S211 is a convex surface and both of the object side surface S210 and image side surface S211 are aspheric surfaces. The sixth lens L26 is with positive refractive power and made of plastic material, wherein the object side surface S212 is a convex surface, the image side surface S213 is a concave surface and both of the object side surface S212 and image side surface S213 are aspheric surfaces. Both of the object side surface S214 and image side surface S215 of the optical filter OF2 are plane surfaces.

In order to maintain excellent optical performance of the optical lens assembly in accordance with the second embodiment of the invention, the optical lens assembly 2 must satisfies the following seven conditions:

$$-1.8 \leq f2_4/f2 \leq -1.3 \quad (8)$$

$$5 \leq f2_5/f2 \leq 100 \quad (9)$$

$0.69 \leq f2/TTL2 \leq 0.85$ (10)

$-1.5 \leq (R2_{11}-R2_{12})/(R2_{11}+R2_{12}) \leq -0.5$ (11)

$0.2 \leq (R2_{21}-R2_{22})/(R2_{21}+R2_{22}) \leq 0.4$ (12)

$-100 \leq (R2_{31}-R2_{32})/(R2_{31}+R2_{32}) \leq 2$ (13)

$3 \leq f2_6/f2 \leq 5$ (14)

wherein $f2_4$ is an effective focal length of the fourth lens L24, f2 is an effective focal length of the optical lens assembly 2, $f2_5$ is an effective focal length of the fifth lens L25, TTL2 is an interval from the object side surface S22 of the first lens L21 to the image plane IMA2 along the optical axis OA2, $R2_{11}$ is a radius of curvature of the object side surface S22 of the first lens L21, $R2_{12}$ is a radius of curvature of the image side surface S23 of the first lens L21, $R2_{21}$ is a radius of curvature of the object side surface S24 of the second lens L22, $R2_{22}$ is a radius of curvature of the image side surface S25 of the second lens L22, $R2_{31}$ is a radius of curvature of the object side surface S26 of the third lens L23, $R2_{32}$ is a radius of curvature of the image side surface S27 of the third lens L23, and $f2_6$ is an effective focal length of the sixth lens L26.

By the above design of the lenses and stop ST2, the optical lens assembly 2 is provided with a shortened total lens length, an increased field of view, an effective corrected aberration and an increased resolution.

In order to achieve the above purposes and effectively enhance the optical performance, the optical lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens. Table 3 shows that the effective focal length is equal to 4.2300 mm, F-number is equal to 2.1, field of view is equal to 68.7° and total lens length is equal to 5.111 mm for the optical lens assembly 2 of the second embodiment of the invention.

TABLE 3

Effective Focal Length = 4.2300 mm
F-number = 2.1
Field of View = 68.7°
Total Lens Length = 5.111 mm

| Surface Number | Radius of Curvature (mm) | Thickness (mm) | Nd | Vd | Remark |
|---|---|---|---|---|---|
| S21 | ∞ | −0.347 | | | Stop ST2 |
| S22 | 1.544 | 0.599 | 1.535 | 55.7 | The First Lens L21 |
| S23 | 9.673 | 0.050 | | | |
| S24 | 3.614 | 0.300 | 1.636 | 23.9 | The Second Lens L22 |
| S25 | 1.672 | 0.276 | | | |
| S26 | 5.848 | 0.394 | 1.535 | 55.7 | The Third Lens L23 |
| S27 | −5.978 | 0.315 | | | |
| S28 | −1.999 | 0.300 | 1.535 | 55.7 | The Fourth Lens L24 |
| S29 | −5.727 | 0.136 | | | |
| S210 | −1.409 | 0.300 | 1.636 | 23.9 | The Fifth Lens L25 |
| S211 | −1.463 | 0.040 | | | |
| S212 | 1.854 | 0.800 | 1.535 | 55.7 | The Sixth Lens L26 |
| S213 | 2.089 | 0.293 | | | |
| S214 | ∞ | 0.210 | 1.517 | 64.2 | Optical Filter OF2 |
| S215 | ∞ | 1.097 | | | |

The aspheric surface sag z of each lens in table 3 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | S22 | S23 | S24 | S25 | S26 | S27 |
|---|---|---|---|---|---|---|
| k | 1.2016E−02 | 0.0000E+00 | −3.5925E+01 | −5.2492E+00 | 0.0000E+00 | −9.0000E+01 |
| A | 6.8724E−03 | −4.1184E−02 | −6.1081E−02 | −5.2358E−03 | −5.0211E−02 | −5.0860E−02 |
| B | 2.4833E−02 | 1.4428E−01 | 7.8082E−02 | 1.2673E−02 | −5.8264E−02 | −7.0518E−02 |
| C | −3.8602E−02 | −1.6189E−01 | 4.5262E−02 | 1.6084E−01 | −7.7396E−03 | 2.6974E−02 |
| D | −9.1903E−03 | 2.4672E−02 | −1.6882E−01 | −2.9525E−01 | 5.3482E−02 | 1.0362E−02 |
| E | 9.1293E−02 | 5.0571E−02 | 5.5227E−02 | 1.8578E−01 | −1.0056E−02 | 3.0531E−02 |
| F | −6.4751E−02 | −4.9584E−02 | 1.4835E−02 | −1.1327E−02 | −2.4688E−02 | 9.1475E−03 |

| Surface Number | S28 | S29 | S210 | S211 | S212 | S213 |
|---|---|---|---|---|---|---|
| k | 0.0000E+00 | 1.6567E+01 | −8.0599E+00 | −5.4869E−01 | −4.4491E+00 | −4.4308E+00 |
| A | −6.4172E−02 | −1.4317E−01 | −4.8093E−02 | 9.7863E−02 | −1.7559E−01 | −9.2779E−02 |
| B | −1.0379E−01 | 8.6967E−02 | −2.7284E−02 | −3.8953E−02 | 9.1448E−02 | 3.1273E−02 |
| C | 8.5545E−02 | 3.0740E−02 | 1.0116E−01 | 2.8782E−02 | −6.5690E−02 | −1.3482E−02 |
| D | −2.2975E−02 | 2.9821E−02 | −4.7162E−02 | 8.9952E−03 | 3.8574E−02 | 4.4466E−03 |
| E | 4.1604E−02 | −1.2771E−02 | −3.0019E−05 | −4.7332E−03 | −1.2217E−02 | −9.0962E−04 |
| F | 6.5231E−02 | −1.6199E−03 | 5.0323E−03 | −3.7475E−03 | 1.9061E−03 | 1.0185E−04 |
| G | −5.6953E−02 | −2.0436E−04 | −1.9171E−03 | 1.2672E−03 | −1.1632E−04 | −4.6604E−06 |

For the optical lens assembly 2 of the second embodiment, the effective focal length $f2_4$ of the fourth lens L24 is equal to −5.9056 mm, the effective focal length f2 of the optical lens assembly 2 is equal to 4.2300 mm, the effective focal length $f2_5$ of the fifth lens L25 is equal to 51.38527 mm, the interval TTL2 from the object side surface S22 of the first lens L21 to the image plane IMA2 along the optical axis OA2 is equal to 5.111 mm, the radius of curvature $R2_{11}$ of the object side surface S22 of the first lens L21 is equal to 1.54413 mm, the radius of curvature $R2_{12}$ of the image side surface S23 of the first lens L21 is equal to 9.67325 mm, the radius of curvature $R2_{21}$ of the object side surface S24 of the second lens L22 is equal to 3.61352 mm, the radius of curvature $R2_{22}$ of the image side surface S25 of the second lens L22 is equal to 1.67168 mm, the radius of curvature $R2_{31}$ of the object side surface S26 of the third lens L23 is equal to 5.84750 mm, the radius of curvature $R2_{32}$ of the image side surface S27 of the second lens L23 is equal to −5.97789 mm and the effective focal length $f2_6$ of the sixth lens L26 is equal to 14.10489 mm. According to the above data, the following values can be obtained:

$$f2_4/f2=-1.3962,$$

$$f2_5/f2=12.1485,$$

$$f2/TTL2=0.8276,$$

$$(R2_{11}-R2_{12})/(R2_{11}+R2_{12})=-0.7247,$$

$$(R2_{21}-R2_{22})/(R2_{21}+R2_{22})=0.3674,$$

$$(R2_{31}-R2_{32})/(R2_{31}+R2_{32})=-90.6927,$$

$$f2_6/f2=3.3347$$

which respectively satisfy the above conditions (8)-(14).

Figure 4A:
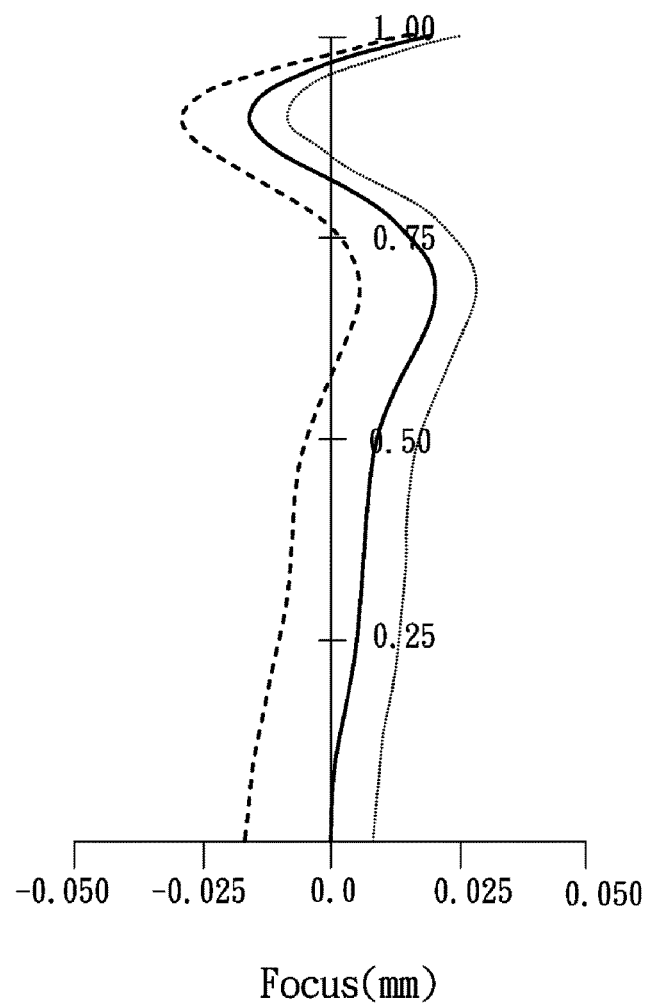
FIG. 4A depicts a longitudinal spherical aberration of the optical lens assembly in accordance with the second embodiment of the invention.
Figure 4B:
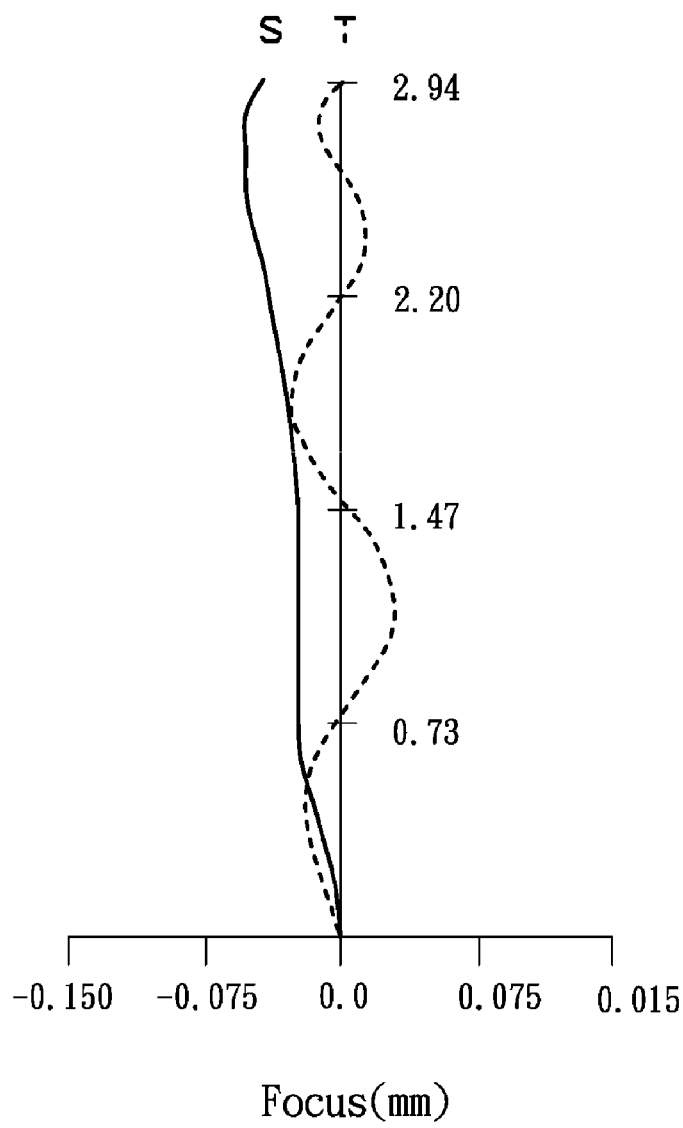
FIG. 4B is an astigmatic field curves diagram of the optical lens assembly in accordance with the second embodiment of the invention.
Figure 4C:
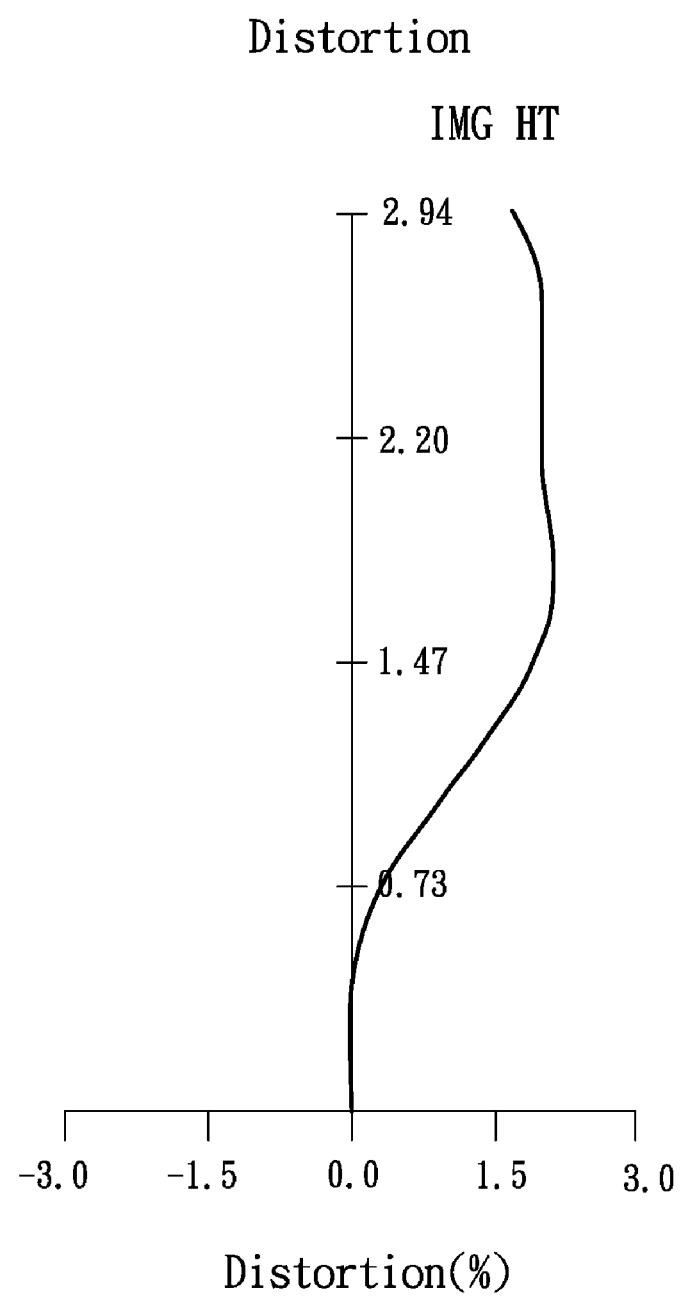
FIG. 4C is a distortion diagram of the optical lens assembly in accordance with the second embodiment of the invention.

By the above arrangements of the lenses and stop ST2, the optical lens assembly 2 of the second embodiment can meet the requirements of optical performance as seen in FIGS. 4A-4C, wherein FIG. 4A shows a longitudinal spherical aberration diagram of the optical lens assembly 2 in accordance with the second embodiment of the invention, FIG. 4B shows an astigmatic field curves of the optical lens assembly 2 in accordance with the second embodiment of the invention and FIG. 4C shows a distortion diagram of the optical lens assembly 2 in accordance with the second embodiment of the invention.

It can be seen from FIG. 4A that the longitudinal spherical aberration in the optical lens assembly 2 of the second embodiment ranges from −0.038 mm to 0.038 mm for the wavelength of 486.1300 nm, 587.5600 nm and 656.2800 nm. It can be seen from FIG. 4B that the astigmatic field curves of tangential direction and sagittal direction in the optical lens assembly 2 of the second embodiment ranges from −0.075 mm to 0.038 mm for the wavelength of 587.5600 nm. It can be seen from FIG. 4C that the distortion in the optical lens assembly 2 of the second embodiment ranges from 0% to 2.3% for the wavelength of 587.5600 nm. It is obvious that the longitudinal spherical aberration, the astigmatic field curves and the distortion of the optical lens assembly 2 of the second embodiment can be corrected effectively. Therefore, the optical lens assembly 2 of the second embodiment is capable of good optical performance.

Figure 5:
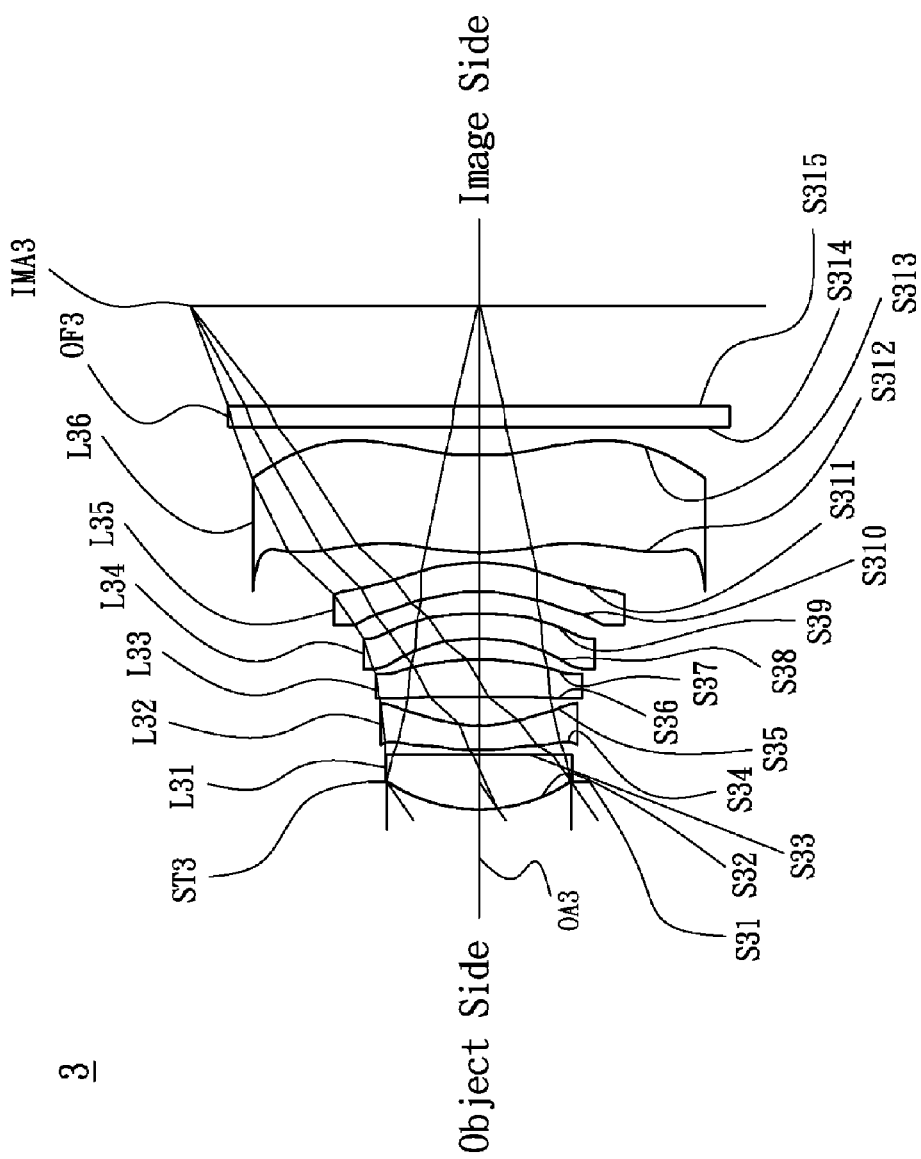
FIG. 5 is a lens layout and optical path diagram of an optical lens assembly in accordance with a third embodiment of the invention.

Referring to FIG. 5, FIG. 5 is a lens layout and optical path diagram of an optical lens assembly in accordance with a third embodiment of the invention. The optical lens assembly 3 includes a stop ST3, a first lens L31, a second lens L32, a third lens L33, a fourth lens L34, a fifth lens L35, a sixth lens L36 and an optical filter OF3, all of which are arranged in sequence from an object side to an image side along an optical axis OA3. In operation, an image of light rays from the object side is formed at an image plane IMA3. The first lens L31 is with positive refractive power and made of plastic material, wherein the object side surface S32 is a convex surface, the image side surface S33 is a convex surface and both of the object side surface S32 and image side surface S33 are aspheric surfaces. The second lens L32 is with negative refractive power and made of plastic material, wherein the object side surface S34 is a convex surface, the image side surface S35 is a concave surface and both of the object side surface S34 and image side surface S35 are aspheric surfaces. The third lens L33 is with positive refractive power and made of plastic material, wherein the object side surface S36 is a convex surface, the image side surface S37 is a convex surface and both of the object side surface S36 and image side surface S37 are aspheric surfaces. The fourth lens L34 is with negative refractive power and made of plastic material, wherein the object side surface S38 is a concave surface, the image side surface S39 is a convex surface and both of the object side surface S38 and image side surface S39 are aspheric surfaces. The fifth lens L35 is with positive refractive power and made of plastic material, wherein the object side surface S310 is a concave surface, the image side surface S311 is a convex surface and both of the object side surface S310 and image side surface S311 are aspheric surfaces. The sixth lens L36 is with positive refractive power and made of plastic material, wherein the object side surface S312 is a convex surface, the image side surface S313 is a concave surface and both of the object side surface S312 and image side surface S313 are aspheric surfaces. Both of the object side surface S314 and image side surface S315 of the optical filter OF3 are plane surfaces.

In order to maintain excellent optical performance of the optical lens assembly in accordance with the third embodiment of the invention, the optical lens assembly 3 must satisfies the following seven conditions:

$$-1.8 \leq f3_4/f3 \leq -1.3 \quad (15)$$

$$5 \leq f3_5/f3 \leq 100 \quad (16)$$

$$0.69 \leq f3/TTL3 \leq 0.85 \quad (17)$$

$$-1.5 \leq (R3_{11}-R3_{12})/(R3_{11}+R3_{12}) \leq -0.5 \quad (18)$$

$$0.2 \leq (R3_{21}-R3_{22})/(R3_{21}+R3_{22}) \leq 0.4 \quad (19)$$

$$-100 \leq (R3_{31}-R3_{22})/(R3_{31}+R3_{32}) \leq 2 \quad (20)$$

$$3 \leq f3_6/f3 \leq 5 \quad (21)$$

wherein $f3_4$ is an effective focal length of the fourth lens L34, f3 is an effective focal length of the optical lens assembly 3, $f3_5$ is an effective focal length of the fifth lens L35, TTL3 is an interval from the object side surface S32 of the first lens L31 to the image plane IMA3 along the optical axis OA3, $R3_{11}$ is a radius of curvature of the object side surface S32 of the first lens L31, $R3_{12}$ is a radius of curvature of the image side surface S33 of the first lens L31, $R3_{21}$ is a radius of curvature of the object side surface S34 of the second lens L32, $R3_{22}$ is a radius of curvature of the image side surface S35 of the second lens L32, $R3_{31}$ is a radius of curvature of the object side surface S36 of the third lens L33, $R3_{32}$ is a radius of curvature of the image side surface S37 of the third lens L33, and $f3_6$ is an effective focal length of the sixth lens L36.

By the above design of the lenses and stop ST3, the optical lens assembly 3 is provided with a shortened total lens length, an increased field of view, an effective corrected aberration and an increased resolution.

In order to achieve the above purposes and effectively enhance the optical performance, the optical lens assembly 3 in accordance with the third embodiment of the invention is provided with the optical specifications shown in Table 5, which include the effective focal length, F-number, field of view, total lens length, radius of curvature of each lens surface, thickness between adjacent surface, refractive index of each lens and Abbe number of each lens. Table 5 shows that the effective focal length is equal to 4.1263 mm, F-number is equal to 2.2, field of view is equal to 69.9° and total lens length is equal to 5.171 mm for the optical lens assembly 3 of the third embodiment of the invention.

TABLE 5

Effective Focal Length = 4.1263 mm
F-number = 2.2
Field of View = 69.9°
Total Lens Length = 5.171 mm

| Surface Number | Radius of Curvature (mm) | Thickness (mm) | Nd | Vd | Remark |
|---|---|---|---|---|---|
| S31 | ∞ | −0.281 | | | Stop ST3 |
| S32 | 1.815 | 0.555 | 1.535 | 55.7 | The First Lens L31 |
| S33 | −18.250 | 0.047 | | | |
| S34 | 2.438 | 0.250 | 1.636 | 23.9 | The Second Lens L32 |
| S35 | 1.278 | 0.291 | | | |
| S36 | 30.562 | 0.392 | 1.535 | 55.7 | The Third Lens L33 |
| S37 | −2.784 | 0.216 | | | |
| S38 | −1.847 | 0.250 | 1.535 | 55.7 | The Fourth Lens L34 |
| S39 | −4.958 | 0.230 | | | |
| S310 | −1.751 | 0.302 | 1.636 | 23.9 | The Fifth Lens L35 |
| S311 | −1.815 | 0.100 | | | |
| S312 | 2.109 | 1.000 | 1.535 | 55.7 | The Sixth Lens L36 |
| S313 | 2.363 | 0.293 | | | |
| S314 | ∞ | 0.210 | 1.517 | 64.2 | Optical Filter OF3 |
| S315 | ∞ | 1.034 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

TABLE 6

| Surface Number | S32 | S33 | S34 | S35 | S36 | S37 |
|---|---|---|---|---|---|---|
| k | 8.5600E−02 | 0.0000E+00 | −3.0092E+01 | −6.0042E+00 | 0.0000E+00 | −1.5470E+01 |
| A | 1.0485E−02 | −2.4744E−03 | −5.9958E−02 | −2.9221E−02 | −2.8395E−02 | −2.6262E−02 |
| B | 2.5578E−02 | 1.5863E−01 | 8.1906E−02 | 9.9743E−02 | −5.4868E−02 | −6.7003E−02 |
| C | −3.3826E−02 | −1.5692E−01 | 4.8353E−02 | 1.5950E−01 | 3.0889E−03 | 2.1464E−02 |
| D | −1.0989E−02 | 2.4844E−02 | −1.7208E−01 | −2.9790E−01 | 6.4614E−02 | 1.0147E−02 |
| E | 9.1784E−02 | 4.9796E−02 | 4.4833E−02 | 1.7282E−01 | −2.7678E−03 | 3.1533E−02 |
| F | −5.9123E−02 | −4.9869E−02 | −6.4308E−03 | −3.6741E−02 | −1.1158E−02 | 8.3940E−03 |

| Surface Number | S38 | S39 | S310 | S311 | S312 | S313 |
|---|---|---|---|---|---|---|
| k | 0.0000E+00 | 1.5608E+01 | −1.2208E+01 | −3.8223E−01 | −2.4260E+00 | −1.4931E+00 |
| A | −3.2003E−02 | −1.7398E−01 | −6.1915E−02 | 8.0596E−02 | −1.7894E−01 | −9.8572E−02 |
| B | −9.0086E−02 | 1.9295E−02 | −4.0918E−02 | −4.1320E−02 | 9.1270E−02 | 3.1400E−02 |
| C | 9.3739E−02 | 3.8081E−02 | 1.0231E−01 | 2.9049E−02 | −6.5557E−02 | −1.3426E−02 |
| D | −2.6288E−02 | 3.3249E−02 | −4.4218E−02 | 9.1629E−03 | 3.8609E−02 | 4.4456E−03 |
| E | 3.5650E−02 | −1.0291E−02 | 9.2237E−04 | −4.8150E−03 | −1.2213E−02 | −9.1056E−04 |
| F | 6.3949E−02 | 4.2240E−04 | 4.7360E−03 | −3.7156E−03 | 1.9056E−03 | 1.0160E−04 |
| G | −4.9096E−02 | 1.0648E−03 | −2.6944E−03 | 1.3101E−03 | −1.1688E−04 | −4.6674E−06 |

For the optical lens assembly 3 of the third embodiment, the effective focal length $f3_4$ of the fourth lens L34 is equal to −5.6582 mm, the effective focal length f3 of the optical lens assembly 3 is equal to 4.1263 mm, the effective focal length $f3_5$ of the fifth lens L35 is equal to 94.59428 mm, the interval TTL3 from the object side surface S32 of the first lens L31 to the image plane IMA3 along the optical axis OA3 is equal to 5.171 mm, the radius of curvature $R3_{11}$ of the object side surface S32 of the first lens L31 is equal to 1.81502 mm, the radius of curvature $R3_{12}$ of the image side surface S33 of the first lens L31 is equal to −18.25035 mm, the radius of curvature $R3_{21}$ of the object side surface S34 of the second lens L32 is equal to 2.43828 mm, the radius of curvature $R3_{22}$ of the image side surface S35 of the second lens L32 is equal to 1.27797 mm, the radius of curvature $R3_{31}$ of the object side surface S36 of the third lens L33 is equal to 30.56156 mm, the radius of curvature $R3_{32}$ of the image side surface S37 of the second lens L33 is equal to −2.78424 mm and the effective focal length $f3_6$ of the sixth lens L36 is equal to 15.46644 mm. According to the above data, the following values can be obtained:

$f3_4/f3 = -1.3713$, $f3_5/f3 = 22.9247$, $f3/TTL3 = 0.7980$, $(R3_{11}-R3_{12})/(R3_{11}+R3_{12}) = -2.2209$, $(R3_{21}-R3_{22})/(R3_{21}+R3_{22}) = 0.3122$, $(R3_{31}-R3_{32})/(R3_{31}+R3_{32}) = 1.2005$, $f3_6/f3 = 3.7483$ which respectively satisfy the above conditions (15)-(21).

Figure 6A:
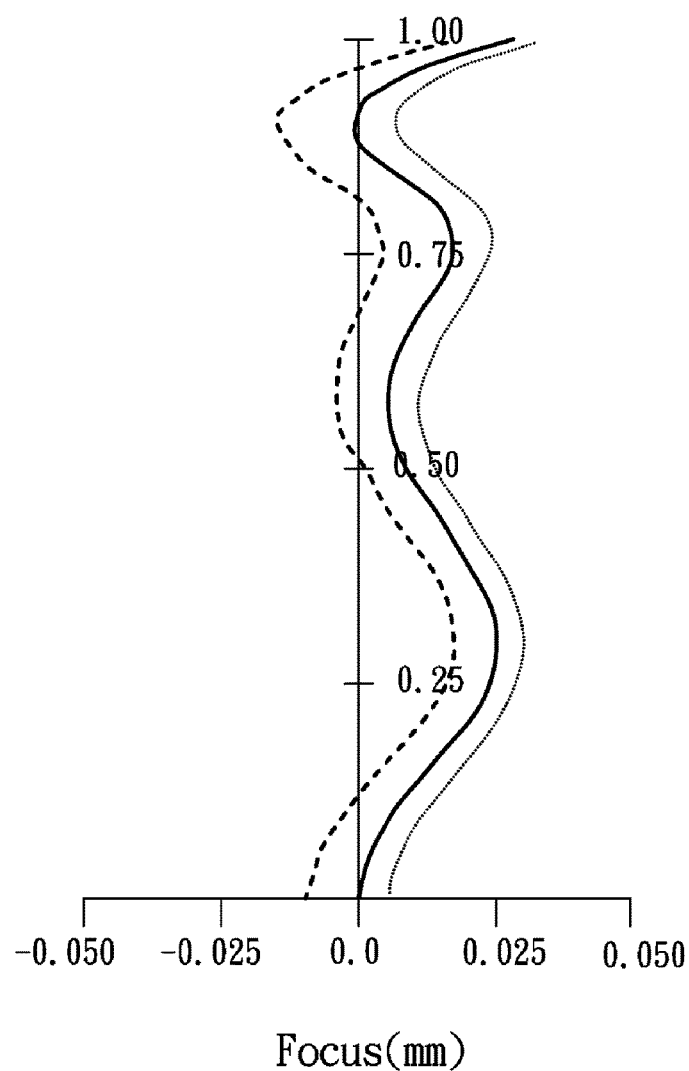
FIG. 6A depicts a longitudinal spherical aberration of the optical lens assembly in accordance with the third embodiment of the invention.
Figure 6B:
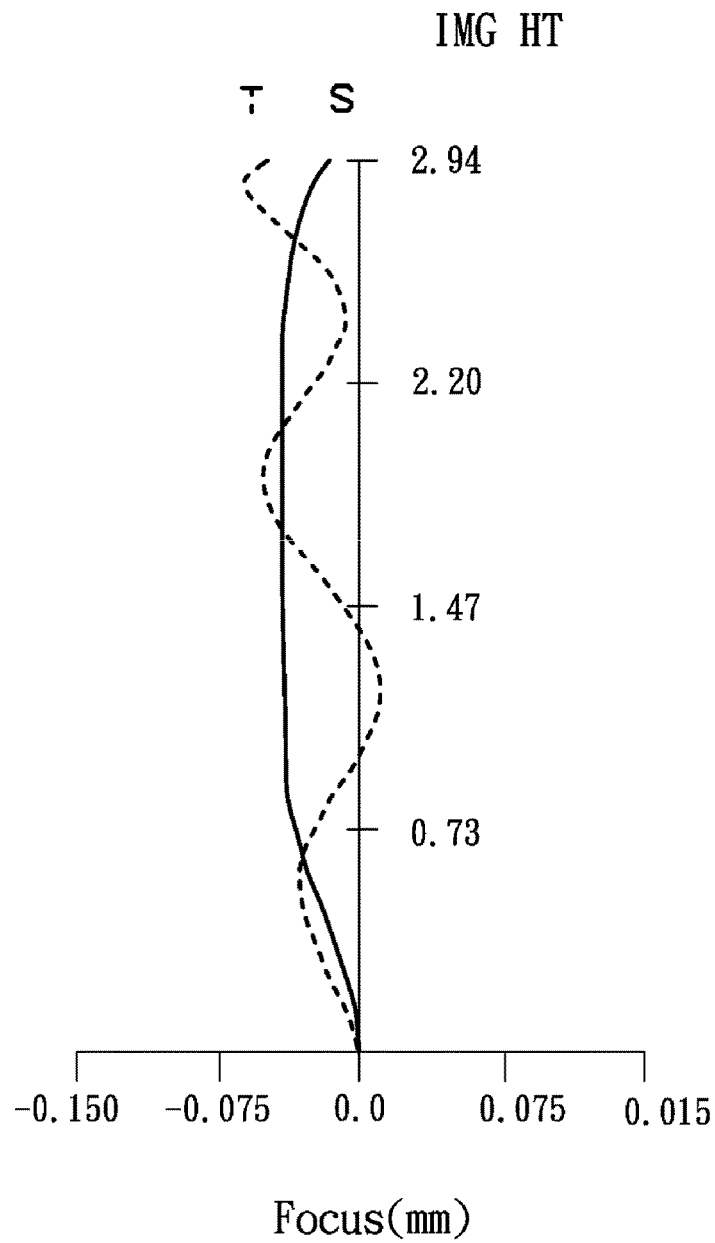
FIG. 6B is an astigmatic field curves diagram of the optical lens assembly in accordance with the third embodiment of the invention.
Figure 6C:
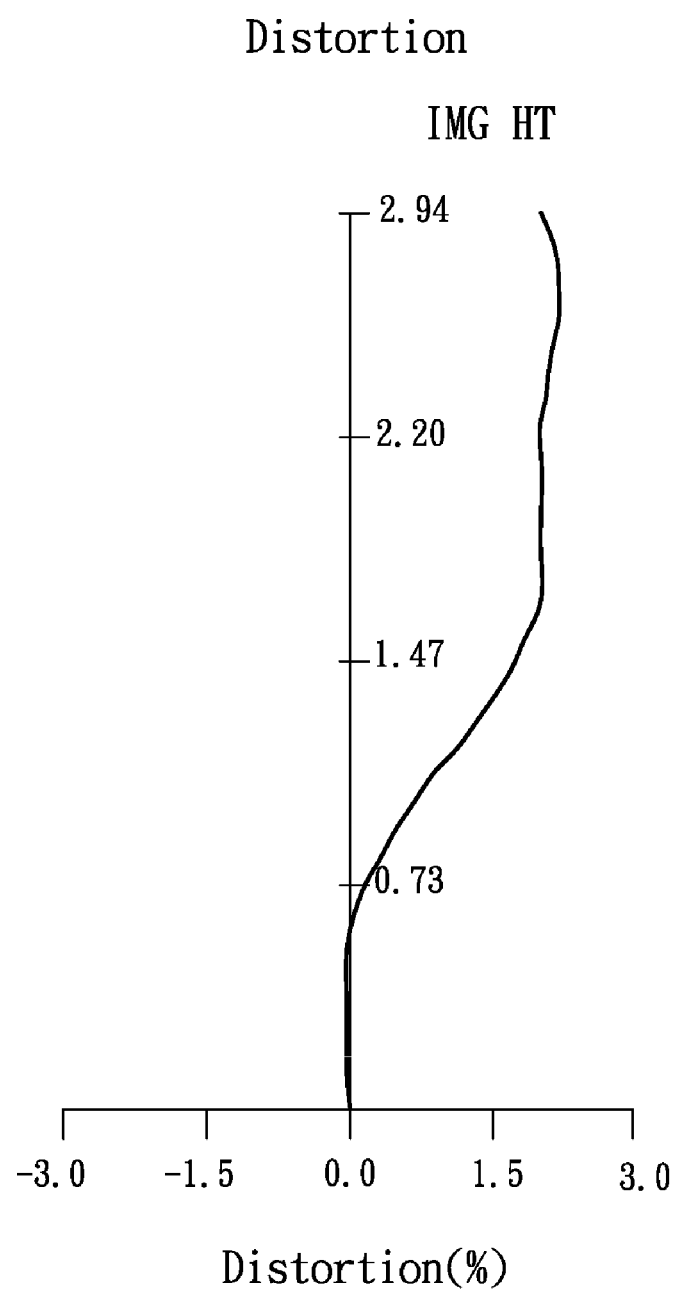
FIG. 6C is a distortion diagram of the optical lens assembly in accordance with the third embodiment of the invention.

By the above arrangements of the lenses and stop ST3, the optical lens assembly 3 of the third embodiment can meet the requirements of optical performance as seen in FIGS. 6A-6C, wherein FIG. 6A shows a longitudinal spherical aberration diagram of the optical lens assembly 3 in accordance with the third embodiment of the invention, FIG. 6B shows an astigmatic field curves of the optical lens assembly 3 in accordance with the third embodiment of the invention and FIG. 6C shows a distortion diagram of the optical lens assembly 3 in accordance with the third embodiment of the invention.

It can be seen from FIG. 6A that the longitudinal spherical aberration in the optical lens assembly 3 of the third embodiment ranges from −0.025 mm to 0.038 mm for the wavelength of 486.1300 nm, 587.5600 nm and 656.2800 nm. It can be seen from FIG. 6B that the astigmatic field curves of tangential direction and sagittal direction in the optical lens assembly 3 of the third embodiment ranges from −0.075 mm to 0.013 mm for the wavelength of 587.5600 nm. It can be seen from FIG. 6C that the distortion in the optical lens assembly 3 of the third embodiment ranges from 0% to 2.3% for the wavelength of 587.5600 nm. It is obvious that the longitudinal spherical aberration, the astigmatic field curves and the distortion of the optical lens assembly 3 of the third embodiment can be corrected effectively. Therefore, the optical lens assembly 3 of the third embodiment is capable of good optical performance.

Figure 7:
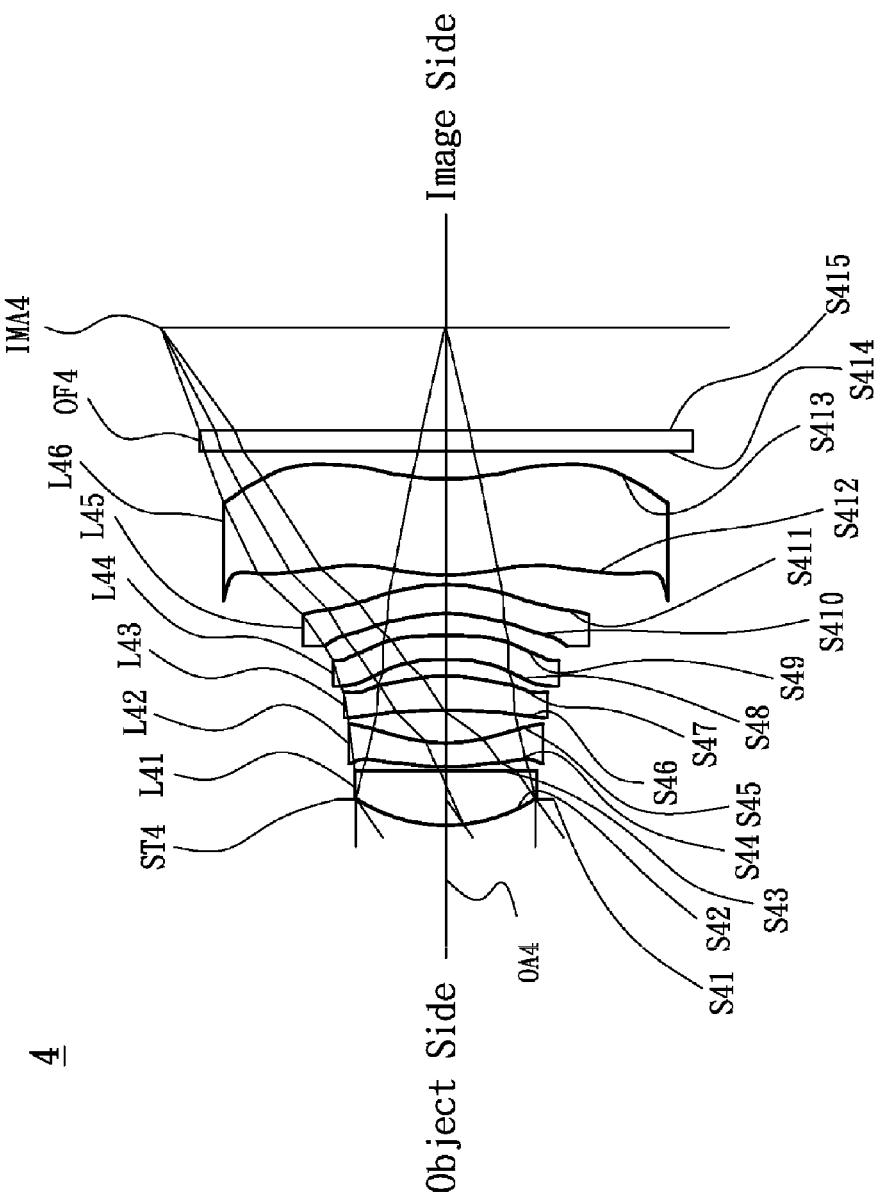
FIG. 7 is a lens layout and optical path diagram of an optical lens assembly in accordance with a fourth embodiment of the invention.

Referring to FIG. 7, FIG. 7 is a lens layout and optical path diagram of an optical lens assembly in accordance with a fourth embodiment of the invention. The optical lens assembly 4 includes a stop ST4, a first lens L41, a second lens L42, a third lens L43, a fourth lens L44, a fifth lens L45, a sixth lens L46 and an optical filter OF4, all of which are arranged in sequence from an object side to an image side along an optical axis OA4. In operation, an image of light rays from the object side is formed at an image plane IMA4. The first lens L41 is with positive refractive power and made of plastic material, wherein the object side surface S42 is a convex surface, the image side surface S43 is a convex surface and both of the object side surface S42 and image side surface S43 are aspheric surfaces. The second lens L42 is with negative refractive power and made of plastic material, wherein the object side surface S44 is a convex surface, the image side surface S45 is a concave surface and both of the object side surface S44 and image side surface S45 are aspheric surfaces. The third lens L43 is with positive refractive power and made of plastic material, wherein the object side surface S46 is a concave surface, the image side surface S47 is a convex surface and both of the object side surface S46 and image side surface S47 are aspheric surfaces. The fourth lens L44 is with negative refractive power and made of plastic material, wherein the object side surface S48 is a concave surface, the image side surface S49 is a convex surface and both of the object side surface S48 and image side surface S49 are aspheric surfaces. The fifth lens L45 is with positive refractive power and made of plastic material, wherein the object side surface S410 is a concave surface, the image side surface S411 is a convex surface and both of the object side surface S410 and image side surface S411 are aspheric surfaces. The sixth lens L46 is with positive refractive power and made of plastic material, wherein the object side surface S412 is a convex surface, the image side surface S413 is a concave surface and both of the object side surface S412 and image side surface S413 are aspheric surfaces. Both of the object side surface S414 and image side surface S415 of the optical filter OF4 are plane surfaces.

In order to maintain excellent optical performance of the optical lens assembly in accordance with the fourth embodiment of the invention, the optical lens assembly 4 must satisfies the following seven conditions:

$-1.8 \leq f4_4/f4 \leq -1.3$ (22)

$5 \leq f4_5/f4 \leq 100$ (23)

$0.69 \leq f4/TTL4 \leq 0.85$ (24)

$1.5 \leq (R4_{11}-R4_{12})/(R4_{11}+R4_{12}) \leq -0.5$ (25)

$0.2 \leq (R4_{21}-R4_{22})/(R4_{21}+R4_{22}) \leq 0.4$ (26)

$-100 \leq (R4_{31}-R4_{32})/(R4_{31}+R4_{32}) \leq 2$ (27)

$3 \leq f4_6/f4 \leq 5$ (28)

$65° \leq \text{field of view} \leq 75°$ (29)

wherein $f4_4$ is an effective focal length of the fourth lens L44, f4 is an effective focal length of the optical lens assembly 4, $f4_5$ is an effective focal length of the fifth lens L45, TTL4 is an interval from the object side surface S42 of the first lens L41 to the image plane IMA4 along the optical axis OA4, $R4_{11}$ is a radius of curvature of the object side surface S42 of the first lens L41, $R4_{12}$ is a radius of curvature of the image side surface S43 of the first lens L41, $R4_{21}$ is a radius of curvature of the object side surface S44 of the second lens L42, $R4_{22}$ is a radius of curvature of the image side surface S45 of the second lens L42, $R4_{31}$ is a radius of curvature of the object side surface S46 of the third lens L43, $R4_{32}$ is a radius of curvature of the image side surface S47 of the third lens L43, and $f4_6$ is an effective focal length of the sixth lens L46.

By the above design of the lenses and stop ST4, the optical lens assembly 4 is provided with a shortened total lens length, an increased field of view, an effective corrected aberration and an increased resolution.

In order to achieve the above purposes and effectively enhance the optical performance, the optical lens assembly 4 in accordance with the fourth embodiment of the invention is provided with the optical specifications shown in Table 7, which include the effective focal length, F-number, field of view, total lens length, radius of curvature of each lens surface, thickness between adjacent surface, refractive index of each lens and Abbe number of each lens. Table 7 shows that the effective focal length is equal to 4.0826 mm, F-number is equal to 2.1, field of view is equal to 70.4° and total lens length is equal to 5.162 mm for the optical lens assembly 4 of the fourth embodiment of the invention.

TABLE 7

Effective Focal Length = 4.0826 mm
F-number = 2.1
Field of View = 70.4°
Total Lens Length = 5.162 mm

| Surface Number | Radius of Curvature (mm) | Thickness (mm) | Nd | Vd | Remark |
|---|---|---|---|---|---|
| S41 | ∞ | −0.272 | | | Stop ST4 |
| S42 | 1.832 | 0.565 | 1.535 | 55.7 | The First Lens L41 |
| S43 | −16.041 | 0.040 | | | |
| S44 | 2.638 | 0.250 | 1.636 | 23.9 | The Second Lens L42 |
| S45 | 1.432 | 0.337 | | | |
| S46 | −8.173 | 0.350 | 1.535 | 55.7 | The Third Lens L43 |
| S47 | −2.265 | 0.176 | | | |
| S48 | −1.904 | 0.250 | 1.535 | 55.7 | The Fourth Lens L44 |
| S49 | −4.920 | 0.221 | | | |
| S410 | −1.823 | 0.302 | 1.636 | 23.9 | The Fifth Lens L45 |
| S411 | −1.888 | 0.100 | | | |
| S412 | 2.044 | 1.000 | 1.535 | 55.7 | The Sixth Lens L46 |
| S413 | 2.297 | 0.293 | | | |

TABLE 7-continued

Effective Focal Length = 4.0826 mm
F-number = 2.1
Field of View = 70.4°
Total Lens Length = 5.162 mm

| Surface Number | Radius of Curvature (mm) | Thickness (mm) | Nd | Vd | Remark |
|---|---|---|---|---|---|
| S414 | ∞ | 0.210 | 1.517 | 64.2 | Optical Filter OF4 |
| S415 | ∞ | 1.068 | | | |

The aspheric surface sag z of each lens in table 7 can be calculated by the following formula:

$$z = ch^2 / \{1 + [1-(k+1)c^2h^2]^{1/2}\} + Ah^4 + Bh^6 + Ch^8 + Dh^{10} + Eh^{12} \pm Fh^{14} \pm Gh^{16}$$

where c is curvature, h is the vertical distance from the lens surface to the optical axis, k is conic constant and A, B, C, D, E, F and G are aspheric coefficients.

In the fourth embodiment, the conic constant k and the aspheric coefficients A, B, C, D, E, F, G of each surface are shown in Table 8.

TABLE 8

| Surface Number | S42 | S43 | S44 | S45 | S46 | S47 |
|---|---|---|---|---|---|---|
| k | 8.3272E−02 | 0.0000E+00 | −2.9769E+01 | −6.0871E+00 | 0.0000E+00 | −9.6009E+00 |
| A | 1.0302E−02 | −1.2172E−02 | −6.4239E−02 | −3.9581E−02 | −2.9812E−02 | −2.3842E−02 |
| B | 2.6078E−02 | 1.5369E−01 | 6.8919E−02 | −4.7275E−03 | −5.3846E−02 | −6.1248E−02 |
| C | −3.1775E−02 | −1.5660E−01 | 4.1798E−02 | 1.5731E−01 | 8.8898E−03 | 2.3939E−02 |
| D | −1.2264E−02 | 2.5412E−02 | −1.6990E−02 | −2.9826E−01 | 6.8404E−02 | 9.8200E−03 |
| E | 8.9650E−02 | 4.9854E−02 | 4.7504E−02 | 1.7382E−01 | −1.4897E−03 | 3.1231E−02 |
| F | −5.6906E−02 | −5.0571E−02 | −1.1305E−02 | −3.3950E−02 | −1.0423E−02 | 7.8761E−03 |

| Surface Number | S48 | S49 | S410 | S411 | S412 | S413 |
|---|---|---|---|---|---|---|
| k | 0.0000E+00 | 1.5655E+01 | −1.2792E+01 | −3.5088E−01 | −2.5439E+00 | −1.6830E+00 |
| A | −2.1116E−02 | −1.9177E−01 | −5.3690E−02 | 8.2760E−02 | −1.8001E−01 | −9.8264E−02 |
| B | −9.2821E−02 | 2.8238E−02 | −4.5205E−02 | −4.3724E−02 | 9.1204E−02 | 3.1293E−02 |
| C | 9.2083E−02 | 3.7120E−02 | 1.0349E−01 | 2.8658E−02 | −6.5526E−02 | −1.3448E−02 |
| D | −2.6503E−02 | 3.1748E−02 | −4.3923E−02 | 9.2025E−02 | 3.8620E−02 | 4.4373E−03 |
| E | 3.5576E−02 | −1.0321E−02 | 1.7031E−04 | −4.7598E−03 | −1.2211E−02 | −9.1110E−04 |
| F | 6.4177E−02 | 1.1771E−03 | 4.3734E−03 | −3.6939E−03 | 1.9056E−03 | 1.0174E−04 |
| G | −4.8024E−02 | 1.9130E−03 | −2.5662E−03 | 1.3153E−03 | −1.1700E−04 | −4.6157E−06 |

For the optical lens assembly 4 of the fourth embodiment, the effective focal length $f4_4$ of the fourth lens L44 is equal to −5.9766 mm, the effective focal length f4 of the optical lens assembly 4 is equal to 4.0826 mm, the effective focal length $f4_5$ of the fifth lens L45 is equal to 102.82794 mm, the interval TTL4 from the object side surface S42 of the first lens L41 to the image plane IMA4 along the optical axis OA4 is equal to 5.162 mm, the radius of curvature $R4_{11}$ of the object side surface S42 of the first lens L41 is equal to 1.83223 mm, the radius of curvature $R4_{12}$ of the image side surface S43 of the first lens L41 is equal to −16.04122 mm, the radius of curvature $R4_{21}$ of the object side surface S44 of the second lens L42 is equal to 2.63800 mm, the radius of curvature $R4_{22}$ of the image side surface S45 of the second lens L42 is equal to 1.43222 mm, the radius of curvature $R4_{31}$ of the object side surface S46 of the third lens L43 is equal to −8.17324 mm, the radius of curvature $R4_{32}$ of the image side surface S47 of the second lens L43 is equal to −2.26469 mm and the effective focal length $f4_6$ of the sixth lens L46 is equal to 14.57148 mm. According to the above data, the following values can be obtained:

$f4_4/f4 = -1.4639$, $f4_5/f4 = 25.1870$, $f4/TTL4 = 0.7910$, $(R4_{11} - R4_{12})/(R4_{11} + R4_{12}) = -1.2579$, $(R4_{21} - R4_{22})/(R4_{21} + R4_{22}) = 0.2962$, $(R4_{31} - R4_{32})/(R4_{31} + R4_{32}) = 0.5661$, $f4_6/f4 = 3.5692$ field of view=70.4° which respectively satisfy the above conditions (22)-(29).

Figure 8A:
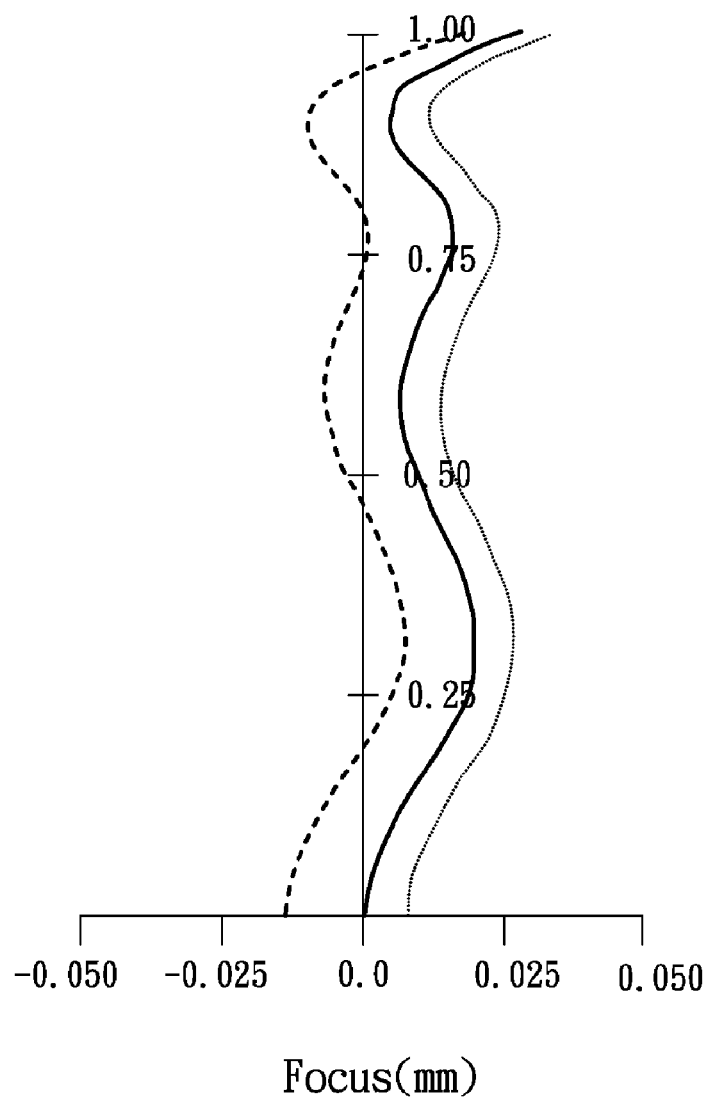
FIG. 8A depicts a longitudinal spherical aberration of the optical lens assembly in accordance with the fourth embodiment of the invention.
Figure 8B:
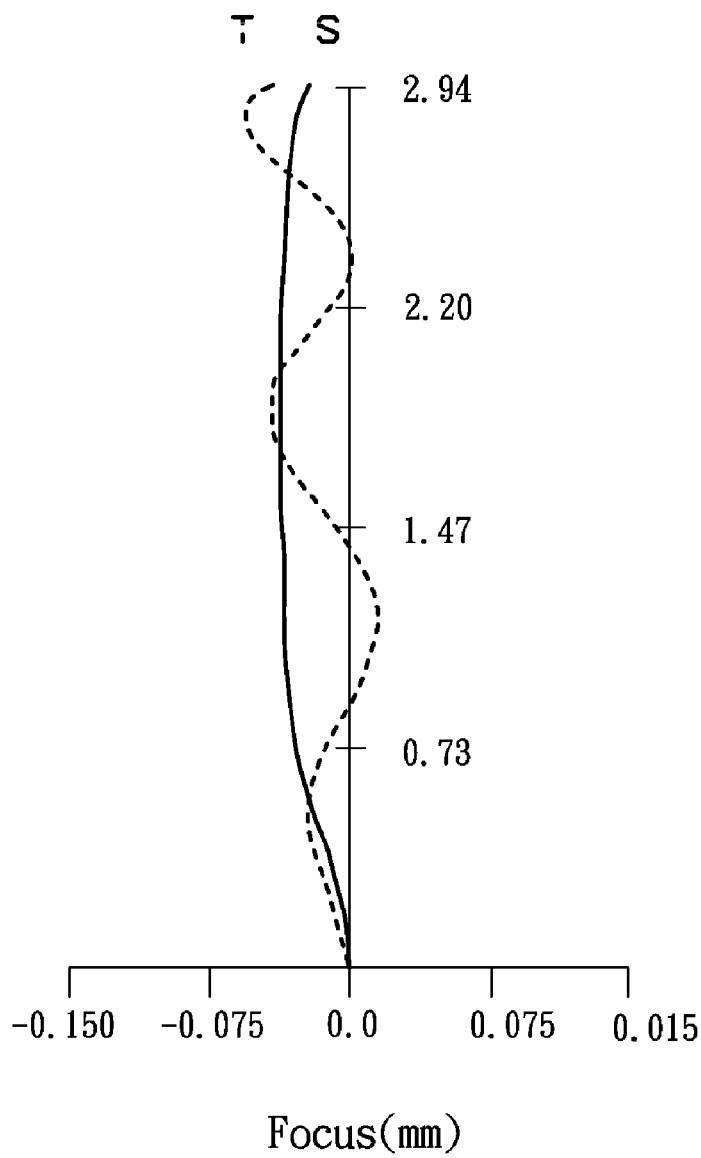
FIG. 8B is an astigmatic field curves diagram of the optical lens assembly in accordance with the fourth embodiment of the invention.
Figure 8C:
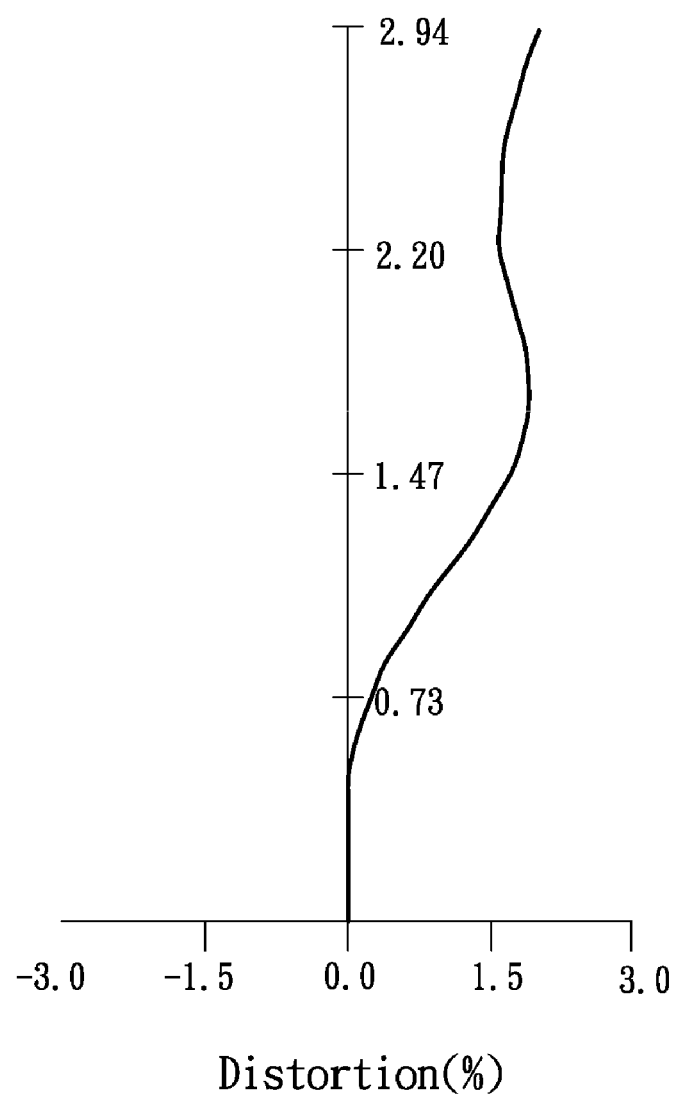
FIG. 8C is a distortion diagram of the optical lens assembly in accordance with the fourth embodiment of the invention.

By the above arrangements of the lenses and stop ST4, the optical lens assembly 4 of the fourth embodiment can meet the requirements of optical performance as seen in FIGS. 8A-8C, wherein FIG. 8A shows a longitudinal spherical aberration diagram of the optical lens assembly 4 in accordance with the fourth embodiment of the invention, FIG. 8B shows an astigmatic field curves of the optical lens assembly 4 in accordance with the fourth embodiment of the invention and FIG. 8C shows a distortion diagram of the optical lens assembly 4 in accordance with the fourth embodiment of the invention.

It can be seen from FIG. 8A that the longitudinal spherical aberration in the optical lens assembly 4 of the fourth embodiment ranges from −0.025 mm to 0.038 mm for the wavelength of 486.1300 nm, 587.5600 nm and 656.2800 nm. It can be seen from FIG. 8B that the astigmatic field curves of tangential direction and sagittal direction in the optical lens assembly 4 of the fourth embodiment ranges from −0.075 mm to 0.013 mm for the wavelength of 587.5600 nm. It can be seen from FIG. 8C that the distortion in the optical lens assembly 4 of the fourth embodiment ranges from 0% to 2.3% for the wavelength of 587.5600 nm. It is obvious that the longitudinal spherical aberration, the astigmatic field curves and the distortion of the optical lens assembly 4 of the fourth embodiment can be corrected effectively. Therefore, the optical lens assembly 4 of the fourth embodiment is capable of good optical performance.

Figure 9:
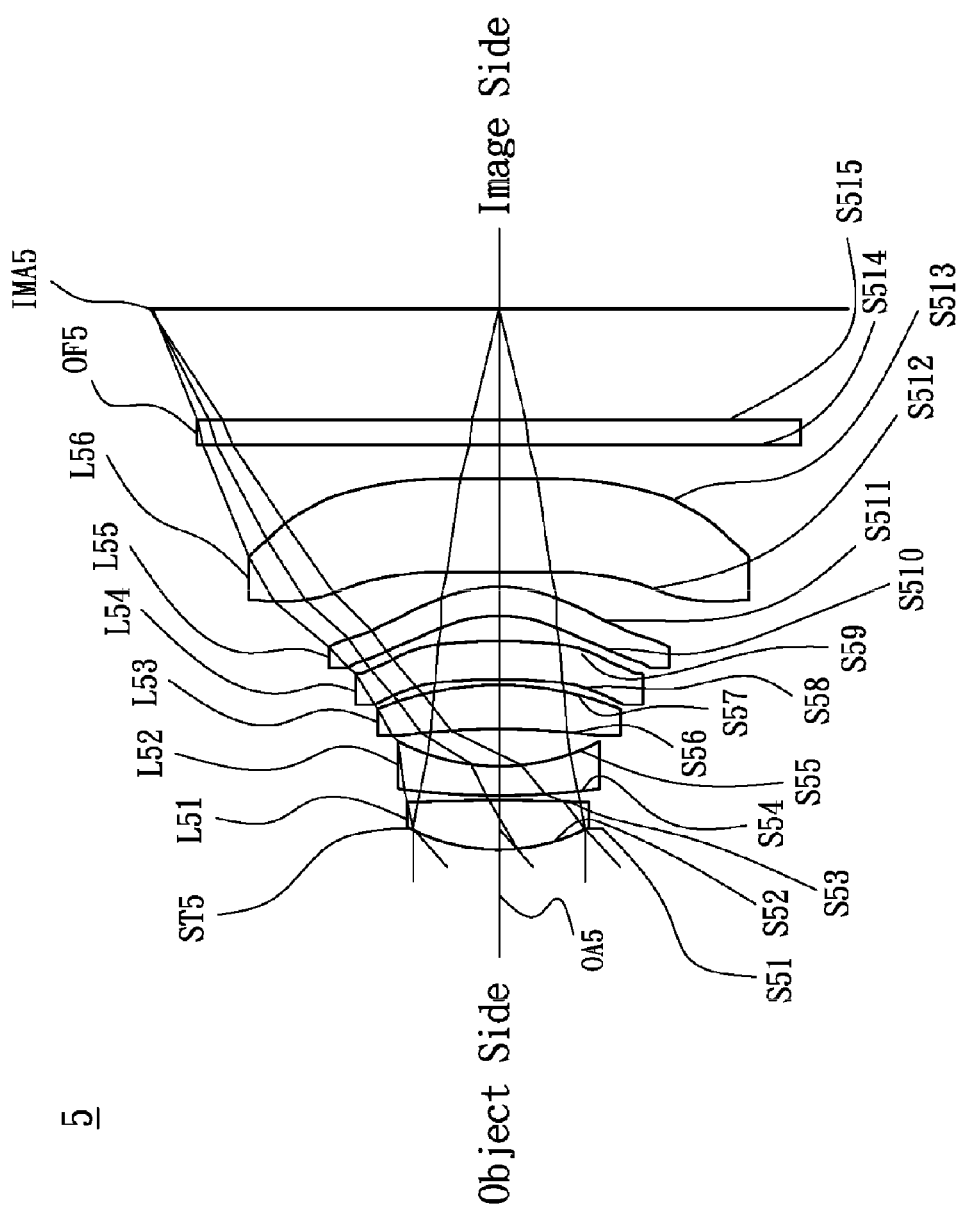
FIG. 9 is a lens layout and optical path diagram of an optical lens assembly in accordance with a fifth embodiment of the invention.

Referring to FIG. 9, FIG. 9 is a lens layout and optical path diagram of an optical lens assembly in accordance with a fifth embodiment of the invention. The optical lens assembly 5 includes a stop ST5, a first lens L51, a second lens L52, a third lens L53, a fourth lens L54, a fifth lens L55, a sixth lens L56 and an optical filter OF5, all of which are arranged in sequence from an object side to an image side along an optical axis OA5. In operation, an image of light rays from the object side is formed at an image plane IMA5. The first lens L51 is with positive refractive power and made of plastic material, wherein the object side surface S52 is a convex surface, the image side surface S53 is a convex surface and both of the object side surface S52 and image side surface S53 are aspheric surfaces. The second lens L52 is with negative refractive power and made of plastic material, wherein the object side surface S54 is a convex surface, the image side surface S55 is a concave surface and both of the object side surface S54 and image side surface S55 are aspheric surfaces. The third lens L53 is with positive refractive power and made of plastic material, wherein the object side surface S56 is a concave surface, the image side surface S57 is a convex surface and both of the object side surface S56 and image side surface S57 are aspheric surfaces. The fourth lens L54 is with positive refractive power and made of plastic material, wherein the object side surface S58 is a concave surface, the image side surface S59 is a convex surface and both of the object side surface S58 and image side surface S59 are aspheric surfaces. The fifth lens L55 is with positive refractive power and made of plastic material, wherein the object side surface S510 is a concave surface, the image side surface S511 is a convex surface and both of the object side surface S510 and image side surface S511 are aspheric surfaces. The sixth lens L56 is with positive refractive power and made of plastic material, wherein the object side surface S512 is a convex surface, the image side surface S513 is a concave surface and both of the object side surface S512 and image side surface S513 are aspheric surfaces. Both of the object side surface S514 and image side surface S515 of the optical filter OF5 are plane surfaces.

In order to maintain excellent optical performance of the optical lens assembly in accordance with the fifth embodiment of the invention, the optical lens assembly 5 must satisfies the following two conditions:

$$10 \leq f5_4/f5 \leq 25 \quad (30)$$

$$0.69 \leq f5/TTL5 \leq 0.85 \quad (31)$$

wherein $f5_4$ is an effective focal length of the fourth lens L54, f5 is an effective focal length of the optical lens assembly 5 and TTL5 is an interval from the object side surface S52 of the first lens L51 to the image plane IMA5 along the optical axis OA5.

By the above design of the lenses and stop ST5, the optical lens assembly 5 is provided with a shortened total lens length, an increased field of view, an effective corrected aberration and an increased resolution.

In order to achieve the above purposes and effectively enhance the optical performance, the optical lens assembly 5 in accordance with the fifth embodiment of the invention is provided with the optical specifications shown in Table 9, which include the effective focal length, F-number, field of view, total lens length, radius of curvature of each lens surface, thickness between adjacent surface, refractive index of each lens and Abbe number of each lens. Table 9 shows that the effective focal length is equal to 3.2114 mm, F-number is equal to 2.2, field of view is equal to 83.9° and total lens length is equal to 4.599 mm for the optical lens assembly 5 of the fifth embodiment of the invention.

TABLE 9

Effective Focal Length = 3.2114 mm
F-number = 2.2
Field of View = 83.9°
Total Lens Length = 4.599 mm

| Surface Number | Radius of Curvature (mm) | Thickness (mm) | Nd | Vd | Remark |
|---|---|---|---|---|---|
| S51 | ∞ | −0.174 | | | Stop ST5 |
| S52 | 1.679 | 0.410 | 1.535 | 55.7 | The First Lens L51 |
| S53 | −22.916 | 0.048 | | | |
| S54 | 3.221 | 0.250 | 1.636 | 23.9 | The Second Lens L52 |
| S55 | 1.448 | 0.306 | | | |
| S56 | −17.885 | 0.385 | 1.535 | 55.7 | The Third Lens L53 |
| S57 | −2.640 | 0.048 | | | |
| S58 | −6.731 | 0.332 | 1.535 | 55.7 | The Fourth Lens L54 |
| S59 | −4.958 | 0.213 | | | |
| S510 | −1.061 | 0.250 | 1.636 | 23.9 | The Fifth Lens L55 |
| S511 | −1.151 | 0.121 | | | |
| S512 | 8.790 | 0.797 | 1.535 | 55.7 | The Sixth Lens L56 |
| S513 | 328.651 | 0.293 | | | |
| S514 | ∞ | 0.210 | 1.517 | 64.2 | Optical Filter OF5 |
| S515 | ∞ | 0.936 | | | |

The aspheric surface sag z of each lens in table 9 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fifth embodiment, the conic constant k and the aspheric coefficients A, B, C, D, E, F, G of each surface are shown in Table 10.

TABLE 10

| Surface Number | S52 | S53 | S54 | S55 | S56 | S57 |
|---|---|---|---|---|---|---|
| k | 1.5149E−01 | 0.0000E+00 | −6.1133E+01 | −6.1833E+00 | 0.0000E+00 | −1.4750E+01 |
| A | 1.2384E−02 | −2.2611E−02 | −6.9441E−02 | −4.3290E−03 | −1.8032E−02 | −4.5566E−02 |
| B | 2.4577E−02 | 1.4984E−01 | 8.2065E−02 | 1.5151E−02 | −5.2994E−02 | −6.5716E−02 |
| C | −3.1386E−02 | −1.5299E−01 | 4.4531E−02 | 1.6837E−01 | −2.9807E−03 | 2.2167E−02 |
| D | −4.0718E−03 | 3.4042E−02 | −1.6987E−01 | −2.7944E−01 | 5.7973E−02 | 4.3606E−03 |
| E | 8.3210E−02 | 3.8219E−02 | 6.4949E−02 | 1.8407E−01 | −6.3453E−03 | 2.3187E−02 |
| F | −7.7781E−02 | −6.3801E−02 | 2.6394E−02 | −2.7388E−02 | −1.1773E−02 | 2.9117E−03 |

| Surface Number | S58 | S59 | S510 | S511 | S512 | S513 |
|---|---|---|---|---|---|---|
| k | 0.0000E+00 | 7.2854E+00 | −4.3941E+00 | −7.4411E−01 | −5.8846E+01 | 0.0000E+00 |
| A | −9.3227E−02 | −1.1419E−01 | −6.1300E−02 | 1.2488E−01 | −1.5798E−01 | −6.8112E−02 |
| B | −9.2400E−02 | −2.9728E−02 | −6.2784E−03 | −4.2135E−02 | 9.3646E−02 | 2.8612E−02 |

TABLE 10-continued

| | | | | | | |
|---|---|---|---|---|---|---|
| C | 6.6871E−02 | 2.5369E−02 | 1.0343E−01 | 2.9575E−02 | −6.5734E−02 | −1.3764E−02 |
| D | −4.8330E−02 | 3.2750E−02 | −4.9508E−02 | 9.7893E−03 | 3.8513E−02 | 4.4448E−03 |
| E | 3.0068E−02 | −1.0785E−02 | −1.2392E−03 | −4.5694E−03 | −1.2230E−02 | −9.0781E−04 |
| F | 6.6800E−02 | −7.6372E−04 | 4.8650E−03 | −3.7944E−03 | 1.9049E−03 | 1.0236E−04 |
| G | −4.4454E−02 | 2.4209E−04 | −1.7179E−03 | 1.1848E−03 | −1.1580E−04 | −4.4718E−06 |

For the optical lens assembly 5 of the fifth embodiment, the effective focal length $f5_4$ of the fourth lens L54 is equal to 33.0280 mm, the effective focal length f5 of the optical lens assembly 5 is equal to 3.2114 mm and the interval TTL5 from the object side surface S52 of the first lens L51 to the image plane IMA5 along the optical axis OA5 is equal to 4.599 mm. According to the above data, the following values can be obtained:

$$f5_4/f5=10.2846,$$

$$f5/TTL5=0.6983$$

which respectively satisfy the above conditions (30)-(31).

Figure 10A:
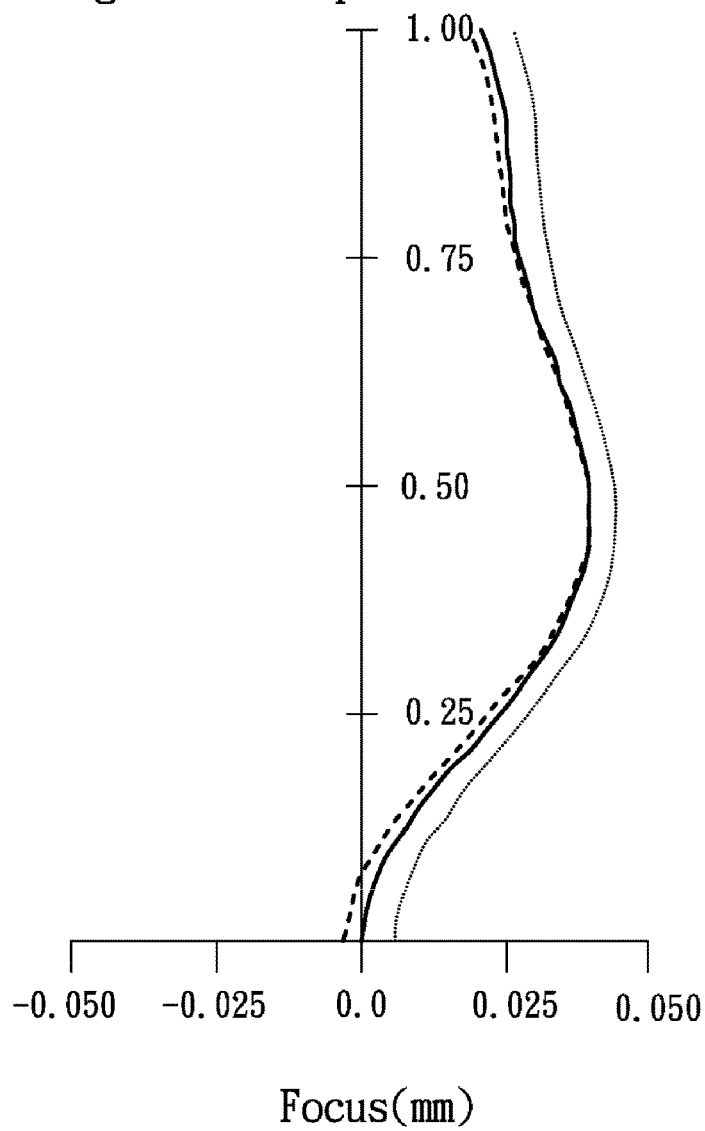
FIG. 10A depicts a longitudinal spherical aberration of the optical lens assembly in accordance with the fifth embodiment of the invention.
Figure 10B:
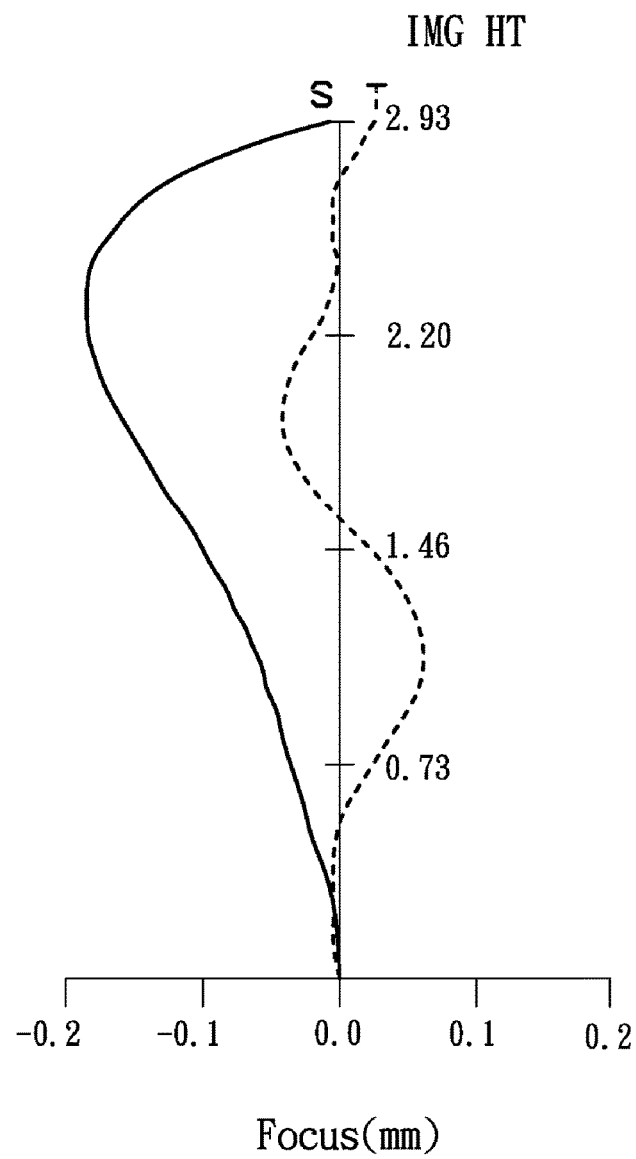
FIG. 10B is an astigmatic field curves diagram of the optical lens assembly in accordance with the fifth embodiment of the invention.
Figure 10C:
FIG. 10C is a distortion diagram of the optical lens assembly in accordance with the fifth embodiment of the invention.

By the above arrangements of the lenses and stop ST5, the optical lens assembly 5 of the fifth embodiment can meet the requirements of optical performance as seen in FIGS. 10A-10C, wherein FIG. 10A shows a longitudinal spherical aberration diagram of the optical lens assembly 5 in accordance with the fifth embodiment of the invention, FIG. 10B shows an astigmatic field curves of the optical lens assembly 5 in accordance with the fifth embodiment of the invention and FIG. 10C shows a distortion diagram of the optical lens assembly 5 in accordance with the fifth embodiment of the invention.

It can be seen from FIG. 10A that the longitudinal spherical aberration in the optical lens assembly 5 of the fifth embodiment ranges from −0.005 mm to 0.045 mm for the wavelength of 435.8400 nm, 546.0700 nm and 656.2800 nm. It can be seen from FIG. 10B that the astigmatic field curves of tangential direction and sagittal direction in the optical lens assembly 5 of the fifth embodiment ranges from −0.2 mm to 0.06 mm for the wavelength of 546.0700 nm. It can be seen from FIG. 10C that the distortion in the optical lens assembly 5 of the fifth embodiment ranges from −0.1% to 2.0% for the wavelength of 546.0700 nm. It is obvious that the longitudinal spherical aberration, the astigmatic field curves and the distortion of the optical lens assembly 5 of the fifth embodiment can be corrected effectively. Therefore, the optical lens assembly 5 of the fifth embodiment is capable of good optical performance.

Figure 11:
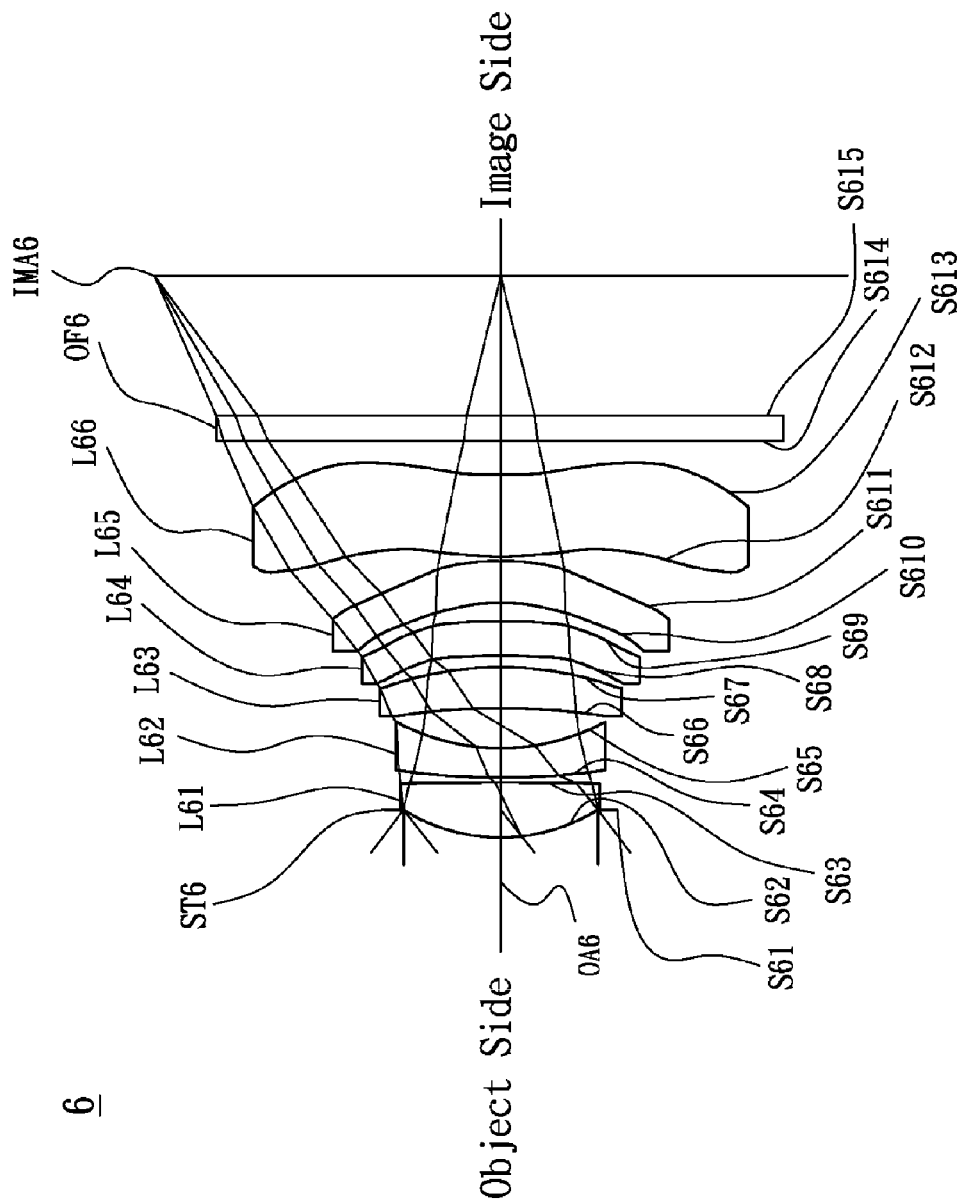
FIG. 11 is a lens layout and optical path diagram of an optical lens assembly in accordance with a sixth embodiment of the invention.

Referring to FIG. 11, FIG. 11 is a lens layout and optical path diagram of an optical lens assembly in accordance with a sixth embodiment of the invention. The optical lens assembly 6 includes a stop ST6, a first lens L61, a second lens L62, a third lens L63, a fourth lens L64, a fifth lens L65, a sixth lens L66 and an optical filter OF6, all of which are arranged in sequence from an object side to an image side along an optical axis OA6. In operation, an image of light rays from the object side is formed at an image plane IMA6. The first lens L61 is with positive refractive power and made of plastic material, wherein the object side surface S62 is a convex surface, the image side surface S63 is a convex surface and both of the object side surface S62 and image side surface S63 are aspheric surfaces. The second lens L62 is with negative refractive power and made of plastic material, wherein the object side surface S64 is a convex surface, the image side surface S65 is a concave surface and both of the object side surface S64 and image side surface S65 are aspheric surfaces. The third lens L63 is with positive refractive power and made of plastic material, wherein the object side surface S66 is a concave surface, the image side surface S67 is a convex surface and both of the object side surface S66 and image side surface S67 are aspheric surfaces. The fourth lens L64 is with positive refractive power and made of plastic material, wherein the object side surface S68 is a concave surface, the image side surface S69 is a convex surface and both of the object side surface S68 and image side surface S69 are aspheric surfaces. The fifth lens L65 is with positive refractive power and made of plastic material, wherein the object side surface S610 is a concave surface, the image side surface S611 is a convex surface and both of the object side surface S610 and image side surface S611 are aspheric surfaces. The sixth lens L66 is with positive refractive power and made of plastic material, wherein the object side surface S612 is a convex surface, the image side surface S613 is a concave surface and both of the object side surface S612 and image side surface S613 are aspheric surfaces. Both of the object side surface S614 and image side surface S615 of the optical filter OF6 are plane surfaces.

In order to maintain excellent optical performance of the optical lens assembly in accordance with the sixth embodiment of the invention, the optical lens assembly 6 must satisfies the following two conditions:

$$10 \leq f6_4/f6 \leq 25 \qquad (32)$$

$$0.69 \leq f6/TTL6 \leq 0.85 \qquad (33)$$

wherein $f6_4$ is an effective focal length of the fourth lens L64, f6 is an effective focal length of the optical lens assembly 6 and TTL6 is an interval from the object side surface S62 of the first lens L61 to the image plane IMA6 along the optical axis OA6.

By the above design of the lenses and stop ST6, the optical lens assembly 6 is provided with a shortened total lens length, an increased field of view, an effective corrected aberration and an increased resolution.

In order to achieve the above purposes and effectively enhance the optical performance, the optical lens assembly 6 in accordance with the sixth embodiment of the invention is provided with the optical specifications shown in Table 11, which include the effective focal length, F-number, field of view, total lens length, radius of curvature of each lens surface, thickness between adjacent surface, refractive index of each lens and Abbe number of each lens. Table 11 shows that the effective focal length is equal to 3.6224 mm, F-number is equal to 2.0, field of view is equal to 77.0° and total lens length is equal to 4.795 mm for the optical lens assembly 6 of the sixth embodiment of the invention.

TABLE 11

Effective Focal Length = 3.6224 mm
F-number = 2.0
Field of View = 77.0°
Total Lens Length = 4.795 mm

| Surface Number | Radius of Curvature (mm) | Thickness (mm) | Nd | Vd | Remark |
|---|---|---|---|---|---|
| S61 | ∞ | −0.229 | | | Stop ST6 |
| S62 | 1.651 | 0.467 | 1.535 | 55.7 | The First Lens L61 |
| S63 | −23.502 | 0.045 | | | |
| S64 | 3.323 | 0.250 | 1.636 | 23.9 | The Second Lens L62 |
| S65 | 1.535 | 0.335 | | | |
| S66 | −8.835 | 0.351 | 1.535 | 55.7 | The Third Lens L63 |
| S67 | −3.774 | 0.103 | | | |
| S68 | −6.426 | 0.295 | 1.535 | 55.7 | The Fourth Lens L64 |
| S69 | −5.741 | 0.156 | | | |
| S610 | −1.579 | 0.362 | 1.636 | 23.9 | The Fifth Lens L65 |
| S611 | −1.629 | 0.030 | | | |
| S612 | 2.528 | 0.700 | 1.535 | 55.7 | The Sixth Lens L66 |
| S613 | 2.763 | 0.293 | | | |
| S614 | ∞ | 0.210 | 1.517 | 64.2 | Optical Filter OF6 |
| S615 | ∞ | 1.198 | | | |

The aspheric surface sag z of each lens in table 11 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the sixth embodiment, the conic constant k and the aspheric coefficients A, B, C, D, E, F, G of each surface are shown in Table 12.

TABLE 12

| Surface Number | S62 | S63 | S64 | S65 | S66 | S67 |
|---|---|---|---|---|---|---|
| k | 7.6761E−02 | 0.0000E+00 | −5.1921E+01 | −5.8498E+00 | 0.0000E+00 | −2.7869E+01 |
| A | 1.0229E−02 | −2.9831E−02 | −6.5735E−02 | −5.2191E−01 | −1.2069E−02 | −4.3722E−02 |
| B | 2.2383E−02 | 1.4510E−01 | 8.0810E−02 | 1.9194E−02 | −4.6806E−02 | −7.3604E−02 |
| C | −3.8862E−02 | −1.6046E−01 | 4.4865E−02 | 1.6754E−01 | −2.1960E−04 | 1.6860E−02 |
| D | −2.0169E−03 | 3.0742E−02 | −1.7856E−01 | −2.8341E−01 | 6.4009E−02 | 1.6843E−03 |
| E | 1.0701E−01 | 8.6662E−02 | 7.2563E−02 | 1.8596E−01 | 2.6372E−03 | 2.1119E−02 |
| F | −8.5300E−02 | −6.0718E−02 | 3.3107E−02 | −1.8621E−02 | −1.1167E−03 | 5.0337E−03 |

| Surface Number | S68 | S69 | S610 | S611 | S612 | S613 |
|---|---|---|---|---|---|---|
| k | 0.0000E+00 | 1.1768E+01 | −1.0578E+01 | −4.3806E−01 | −5.3651E+00 | −4.3753E+00 |
| A | −1.0246E−01 | −1.4653E−01 | −7.6059E−02 | 7.4517E−02 | −1.7089E−01 | −8.5291E−02 |
| B | −1.0239E−01 | −2.3802E−02 | −3.4854E−02 | −5.0560E−02 | 9.1628E−02 | 2.9505E−02 |
| C | 6.4490E−02 | 2.6779E−02 | 9.7574E−02 | 2.7600E−02 | −6.5902E−02 | −1.3583E−02 |
| D | −4.5496E−02 | 3.1569E−02 | −4.7492E−02 | 9.3154E−03 | 3.8512E−02 | 4.4673E−03 |
| E | 3.1394E−02 | −1.1502E−02 | −9.0779E−04 | −4.3944E−03 | −1.2223E−02 | −9.0805E−04 |
| F | 6.6668E−02 | −8.3019E−04 | 4.2697E−03 | −3.6443E−03 | 1.9075E−03 | 1.0190E−04 |
| G | −4.8446E−02 | 7.4691E−04 | −2.7309E−03 | 1.2491E−03 | −1.1509E−04 | −4.6967E−06 |

For the optical lens assembly 6 of the sixth embodiment, the effective focal length $f6_4$ of the fourth lens L64 is equal to 87.4928 mm, the effective focal length f6 of the optical lens assembly 6 is equal to 3.6224 mm and the interval TTL6 from the object side surface S62 of the first lens L61 to the image plane IMA6 along the optical axis OA6 is equal to 4.795 mm. According to the above data, the following values can be obtained:

$f6_4/f6 = 24.1475$, $f6/TTL6 = 0.7555$ which respectively satisfy the above conditions (32)-(33).

Figure 12A:
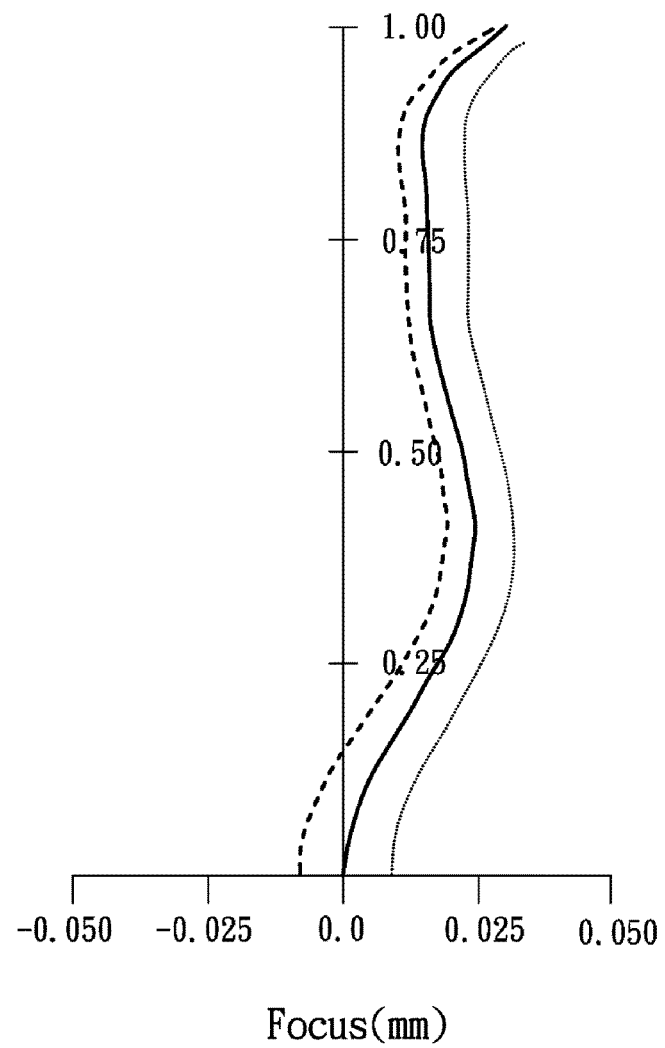
FIG. 12A depicts a longitudinal spherical aberration of the optical lens assembly in accordance with the sixth embodiment of the invention.
Figure 12B:
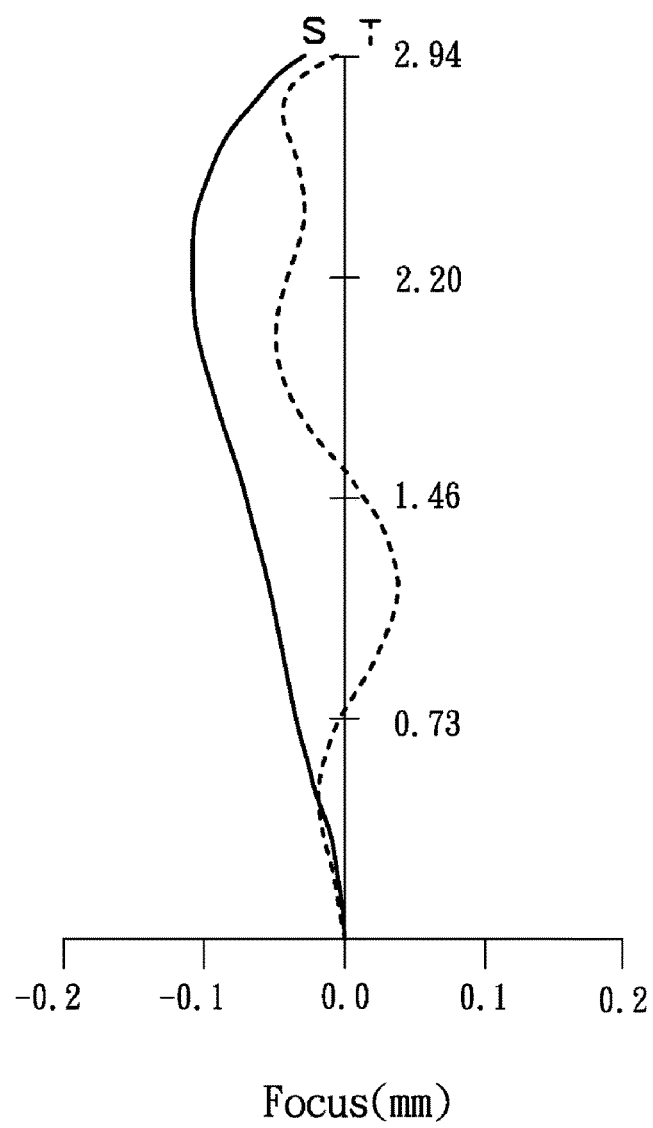
FIG. 12B is an astigmatic field curves diagram of the optical lens assembly in accordance with the sixth embodiment of the invention.
Figure 12C:
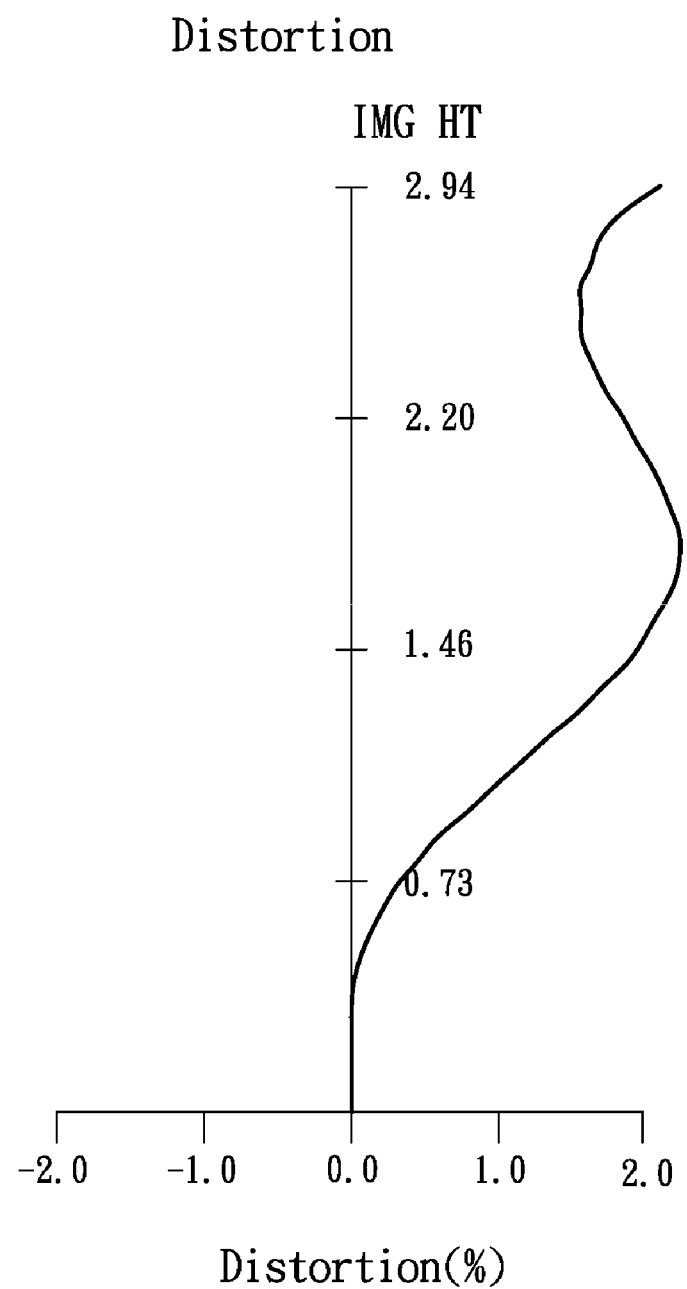
FIG. 12C is a distortion diagram of the optical lens assembly in accordance with the sixth embodiment of the invention.

By the above arrangements of the lenses and stop ST6, the optical lens assembly 6 of the sixth embodiment can meet the requirements of optical performance as seen in FIGS. 12A-12C, wherein FIG. 12A shows a longitudinal spherical aberration diagram of the optical lens assembly 6 in accordance with the sixth embodiment of the invention, FIG. 12B shows an astigmatic field curves of the optical lens assembly 6 in accordance with the sixth embodiment of the invention and FIG. 12C shows a distortion diagram of the optical lens assembly 6 in accordance with the sixth embodiment of the invention.

It can be seen from FIG. 12A that the longitudinal spherical aberration in the optical lens assembly 6 of the sixth embodiment ranges from −0.010 mm to 0.036 mm for the wavelength of 435.8400 nm, 546.0700 nm and 656.2800 nm. It can be seen from FIG. 12B that the astigmatic field curves of tangential direction and sagittal direction in the optical lens assembly 6 of the sixth embodiment ranges from −0.12 mm to 0.04 mm for the wavelength of 546.0700 nm. It can be seen from FIG. 12C that the distortion in the optical lens assembly 6 of the sixth embodiment ranges from 0% to 2.3% for the wavelength of 546.0700 nm. It is obvious that the longitudinal spherical aberration, the astigmatic field curves and the distortion of the optical lens assembly 6 of the sixth embodiment can be corrected effectively. Therefore, the optical lens assembly 6 of the sixth embodiment is capable of good optical performance.

Figure 13:
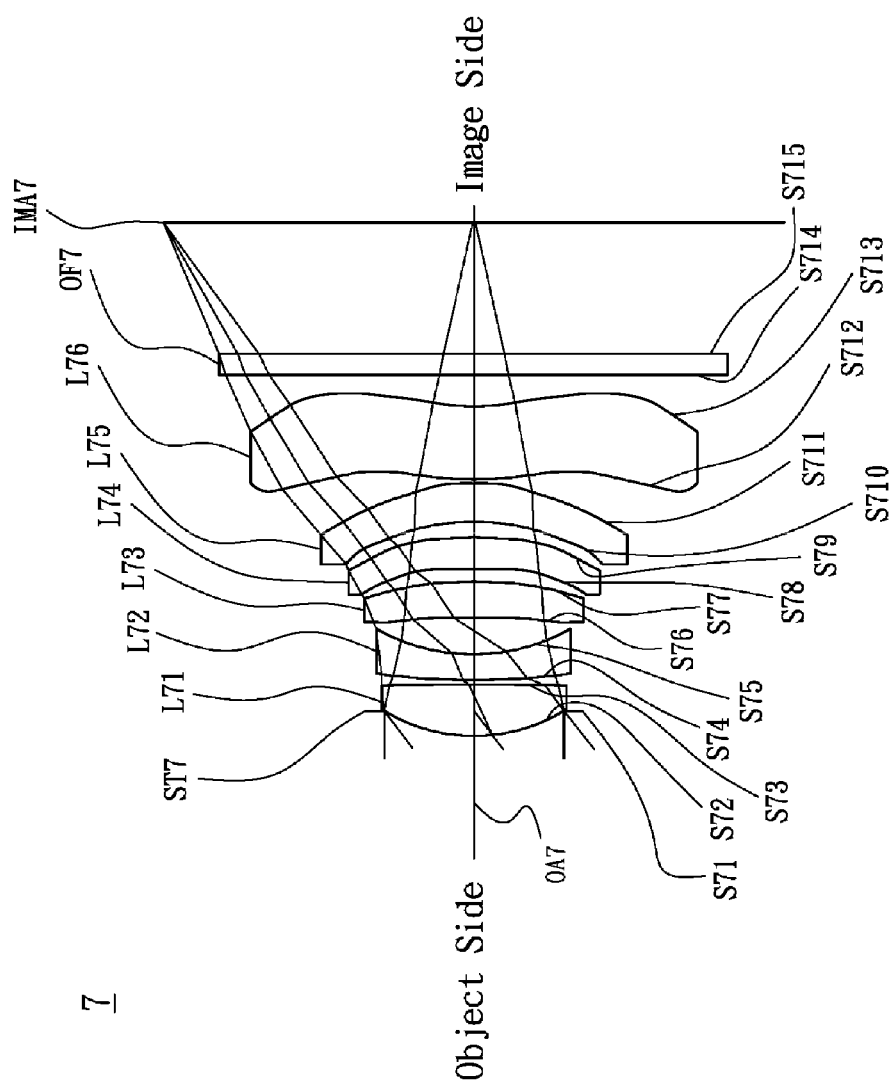
FIG. 13 is a lens layout and optical path diagram of an optical lens assembly in accordance with a seventh embodiment of the invention.

Referring to FIG. 13, FIG. 13 is a lens layout and optical path diagram of an optical lens assembly in accordance with a seventh embodiment of the invention. The optical lens assembly 7 includes a stop ST7, a first lens L71, a second lens L72, a third lens L73, a fourth lens L74, a fifth lens L75, a sixth lens L76 and an optical filter OF7, all of which are arranged in sequence from an object side to an image side along an optical axis OA7. In operation, an image of light rays from the object side is formed at an image plane IMA7. The first lens L71 is with positive refractive power and made of plastic material, wherein the object side surface S72 is a convex surface, the image side surface S73 is a convex surface and both of the object side surface S72 and image side surface S73 are aspheric surfaces. The second lens L72 is with negative refractive power and made of plastic material, wherein the object side surface S74 is a convex surface, the image side surface S75 is a concave surface and both of the object side surface S74 and image side surface S75 are aspheric surfaces. The third lens L73 is with positive refractive power and made of plastic material, wherein the object side surface S76 is a concave surface, the image side surface S77 is a convex surface and both of the object side surface S76 and image side surface S77 are aspheric surfaces. The fourth lens L74 is with positive refractive power and made of plastic material, wherein the object side surface S78 is a concave surface, the image side surface S79 is a convex surface and both of the object side surface S78 and image side surface S79 are aspheric surfaces. The fifth lens L75 is with positive refractive power and made of plastic material, wherein the object side surface S710 is a concave surface, the image side surface S711 is a convex surface and both of the object side surface S710 and image side surface S711 are aspheric surfaces. The sixth lens L76 is with positive refractive power and made of plastic material, wherein the object side surface S712 is a convex surface, the image side surface S713 is a concave surface and both of the object side surface S712 and image side surface S713 are aspheric surfaces. Both of the object side surface S714 and image side surface S715 of the optical filter OF7 are plane surfaces.

In order to maintain excellent optical performance of the optical lens assembly in accordance with the seventh embodiment of the invention, the optical lens assembly 7 must satisfies the following two conditions:

$$10 \leq f7_4/f7 \leq 25 \quad (34)$$

$$0.69 \leq f7/TTL7 \leq 0.85 \quad (35)$$

$$75° \leq \text{field of view} \leq 85° \quad (36)$$

wherein $f7_4$ is an effective focal length of the fourth lens L74, f7 is an effective focal length of the optical lens assembly 7 and TTL7 is an interval from the object side surface S72 of the first lens L71 to the image plane IMA7 along the optical axis OA7.

By the above design of the lenses and stop ST7, the optical lens assembly 7 is provided with a shortened total lens length, an increased field of view, an effective corrected aberration and an increased resolution.

In order to achieve the above purposes and effectively enhance the optical performance, the optical lens assembly 7 in accordance with the seventh embodiment of the invention is provided with the optical specifications shown in Table 13, which include the effective focal length, F-number, field of view, total lens length, radius of curvature of each lens surface, thickness between adjacent surface, refractive index of each lens and Abbe number of each lens. Table 13 shows that the effective focal length is equal to 3.7460 mm, F-number is equal to 2.2, field of view is equal to 75.2° and total lens length is equal to 4.873 mm for the optical lens assembly 7 of the seventh embodiment of the invention.

TABLE 13

Effective Focal Length = 3.7460 mm
F-number = 2.2
Field of View = 75.2°
Total Lens Length = 4.873 mm

| Surface Number | Radius of Curvature (mm) | Thickness (mm) | Nd | Vd | Remark |
|---|---|---|---|---|---|
| S71 | ∞ | −0.242 | | | Stop ST7 |
| S72 | 1.675 | 0.485 | 1.525 | 56.0 | The First Lens L71 |
| S73 | −17.683 | 0.043 | | | |
| S74 | 3.297 | 0.250 | 1.582 | 30.2 | The Second Lens L72 |
| S75 | 1.480 | 0.345 | | | |
| S76 | −9.539 | 0.341 | 1.525 | 56.0 | The Third Lens L73 |
| S77 | −4.565 | 0.124 | | | |
| S78 | −6.905 | 0.298 | 1.525 | 56.0 | The Fourth Lens L74 |
| S79 | −6.126 | 0.152 | | | |
| S710 | −1.687 | 0.366 | 1.582 | 30.2 | The Fifth Lens L75 |
| S711 | −1.737 | 0.030 | | | |
| S712 | 2.208 | 0.700 | 1.525 | 56.0 | The Sixth Lens L76 |
| S713 | 2.443 | 0.293 | | | |
| S714 | ∞ | 0.210 | 1.517 | 64.2 | Optical Filter OF7 |
| S715 | ∞ | 1.235 | | | |

The aspheric surface sag z of each lens in table 13 can be calculated by the following formula:

$$z = ch^2/\{1+[1-(k+1)c^2h^2]^{1/2}\} + Ah^4 \pm Bh^6 + Ch^8 + Dh^{10} + Eh^{12} \pm Fh^{14} \pm Gh^{16}$$

where c is curvature, h is the vertical distance from the lens surface to the optical axis, k is conic constant and A, B, C, D, E, F and G are aspheric coefficients.

In the seventh embodiment, the conic constant k and the aspheric coefficients A, B, C, D, E, F, G of each surface are shown in Table 14.

TABLE 12

| Surface Number | S72 | S73 | S74 | S75 | S76 | S77 |
|---|---|---|---|---|---|---|
| k | 5.4349E−02 | 0.0000E+00 | −5.5598E+01 | −5.6637E+00 | 0.0000E+00 | −3.9945E+01 |
| A | 9.3259E−03 | −2.8924E−02 | −6.6511E−02 | −2.0194E−04 | −1.0360E−02 | −4.5505E−02 |
| B | 2.1558E−02 | 1.4608E−01 | 7.8950E−02 | 1.7938E−02 | −4.4289E−02 | −7.4026E−02 |
| C | −4.0083E−02 | −1.6141E−01 | 4.3135E−02 | 1.6512E−01 | −7.8061E−05 | 1.8249E−02 |
| D | −2.7251E−03 | 2.7828E−02 | −1.7977E−01 | −2.8668E−01 | 6.3853E−02 | 2.8233E−03 |
| E | 1.0824E−01 | 8.5022E−02 | 7.0372E−02 | 1.8241E−01 | 3.4075E−03 | 2.1820E−02 |
| F | −8.2026E−02 | −5.7722E−02 | 2.7766E−02 | −1.8931E−02 | −6.5592E−04 | 5.8173E−03 |

| Surface Number | S78 | S79 | S710 | S711 | S712 | S713 |
|---|---|---|---|---|---|---|
| k | 0.0000E+00 | 1.2609E+01 | −1.2014E+01 | −3.6993E−01 | −4.1762E+00 | −3.7785E+00 |
| A | −1.0159E−01 | −1.5176E−01 | −7.2091E−02 | 6.9556E−02 | −1.7384E−01 | −8.8054E−02 |
| B | −1.0415E−01 | −2.0699E−02 | −3.8963E−02 | −5.0252E−02 | 9.1151E−02 | 2.9744E−02 |
| C | 6.3645E−02 | 2.7091E−02 | 9.7073E−02 | 2.7575E−02 | −6.5923E−02 | −1.3560E−02 |
| D | −4.4925E−02 | 3.0812E−02 | −4.6435E−02 | 9.2870E−03 | 3.8520E−02 | 4.4657E−03 |
| E | 3.2249E−02 | −1.2096E−02 | −4.7437E−04 | −4.3867E−03 | −1.2220E−02 | −9.0854E−04 |

TABLE 12-continued

| F | 6.7027E−02 | −1.0896E−03 | 4.1157E−03 | −3.6441E−03 | 1.9079E−03 | 1.0185E−04 |
| G | −4.8870E−02 | 7.1146E−04 | −3.0628E−03 | 1.2403E−03 | −1.1519E−04 | −4.6868E−06 |

For the optical lens assembly 7 of the seventh embodiment, the effective focal length $f7_4$ of the fourth lens L74 is equal to 91.3460 mm, the effective focal length f7 of the optical lens assembly 7 is equal to 3.7460 mm and the interval TTL7 from the object side surface S72 of the first lens L71 to the image plane IMA7 along the optical axis OA7 is equal to 4.873 mm. According to the above data, the following values can be obtained:

$$f7_4/f7=24.3847,$$

$$f7/TTL7=0.7687$$

field of view=75.2° which respectively satisfy the above conditions (34)-(36).

Figure 14A:
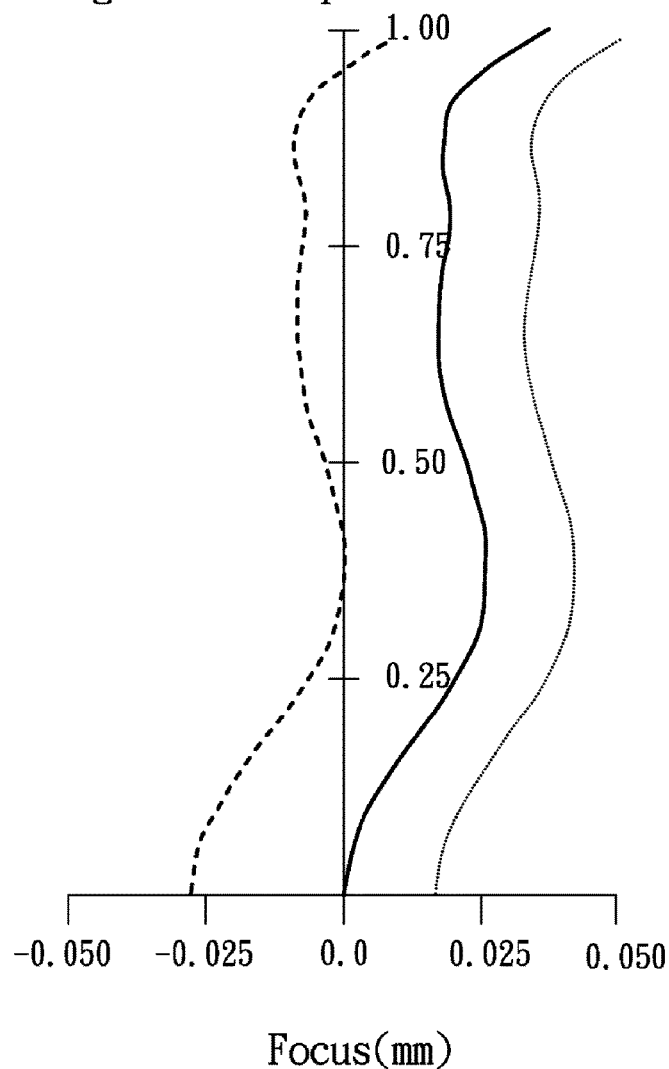
FIG. 14A depicts a longitudinal spherical aberration of the optical lens assembly in accordance with the seventh embodiment of the invention.
Figure 14B:
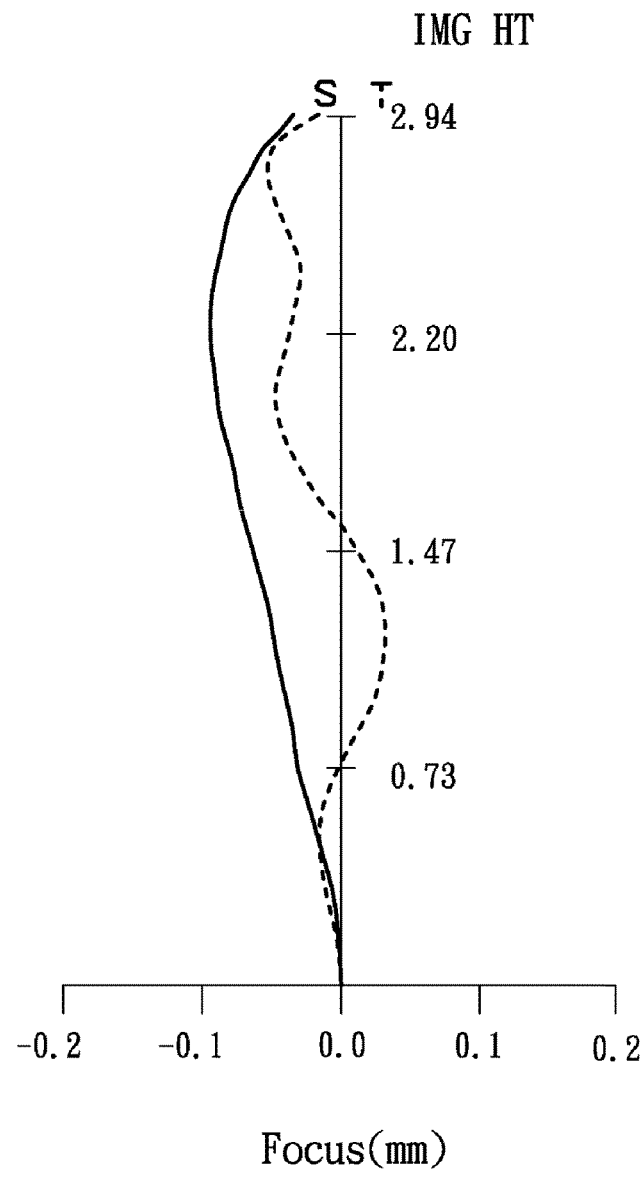
FIG. 14B is an astigmatic field curves diagram of the optical lens assembly in accordance with the seventh embodiment of the invention.
Figure 14C:
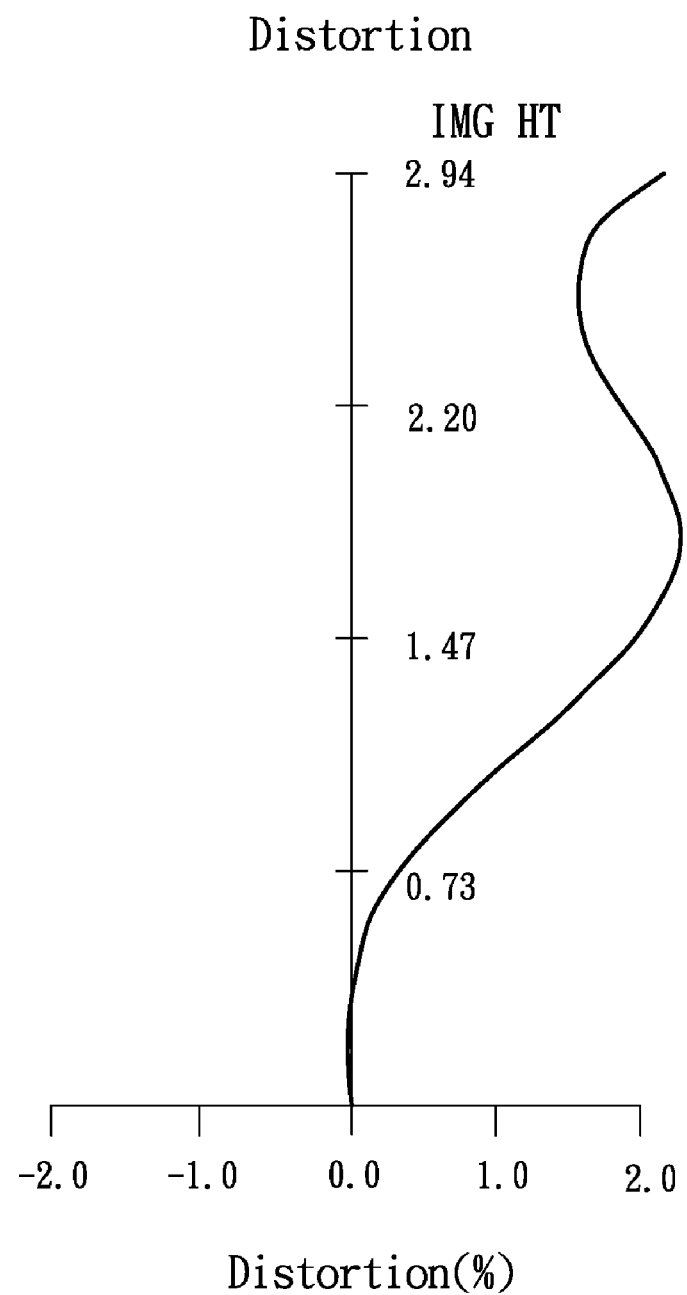
FIG. 14C is a distortion diagram of the optical lens assembly in accordance with the seventh embodiment of the invention.

By the above arrangements of the lenses and stop ST7, the optical lens assembly 7 of the seventh embodiment can meet the requirements of optical performance as seen in FIGS. 14A-14C, wherein FIG. 14A shows a longitudinal spherical aberration diagram of the optical lens assembly 7 in accordance with the seventh embodiment of the invention, FIG. 14B shows an astigmatic field curves of the optical lens assembly 7 in accordance with the seventh embodiment of the invention and FIG. 14C shows a distortion diagram of the optical lens assembly 7 in accordance with the seventh embodiment of the invention.

It can be seen from FIG. 14A that the longitudinal spherical aberration in the optical lens assembly 7 of the seventh embodiment ranges from −0.030 mm to 0.050 mm for the wavelength of 435.8400 nm, 546.0700 nm and 656.2800 nm. It can be seen from FIG. 14B that the astigmatic field curves of tangential direction and sagittal direction in the optical lens assembly 7 of the seventh embodiment ranges from −0.1 mm to 0.05 mm for the wavelength of 546.0700 nm. It can be seen from FIG. 14C that the distortion in the optical lens assembly 7 of the seventh embodiment ranges from −0.1% to 2.3% for the wavelength of 546.0700 nm. It is obvious that the longitudinal spherical aberration, the astigmatic field curves and the distortion of the optical lens assembly 7 of the seventh embodiment can be corrected effectively. Therefore, the optical lens assembly 7 of the seventh embodiment is capable of good optical performance.

In the above embodiments, the object side surface and image side surface of the first, second, third, fourth, fifth and sixth lens are aspheric surfaces. However, it has the same effect and falls into the scope of the invention that any of the object side surface or image side surface of the first, second, third, fourth, fifth and sixth lens are changed into spherical surfaces.

What is claimed is:

1. An optical lens assembly comprising:
a first lens which is with positive refractive power and comprises a convex surface facing an object side;
a second lens which is with negative refractive power;
a third lens which is with positive refractive power;
a fourth lens which is with negative refractive power;
a fifth lens which is with positive refractive power; and
a sixth lens which is with positive refractive power;
wherein the first lens, the second lens, the third lens, the fourth lens, the fifth lens and the sixth lens are arranged in sequence from the object side to an image side along an optical axis of the optical lens assembly,
wherein the optical lens assembly satisfies:

$$3 \leq f_6/f \leq 5$$

wherein $f_6$ is an effective focal length of the sixth lens and f is an effective focal length of the optical lens assembly.

2. The optical lens assembly as claimed in claim 1, wherein the fourth lens is a meniscus lens and comprises a concave surface facing the object side and a convex surface facing the image side.

3. The optical lens assembly as claimed in claim 2, wherein the first lens satisfies:

$$-1.5 \leq (R_{11}-R_{12})/(R_{11}+R_{12}) \leq -0.5$$

wherein $R_{11}$ is a radius of curvature of the convex surface of the first lens and $R_{12}$ is a radius of curvature of an image side surface of the first lens.

4. The optical lens assembly as claimed in claim 1, wherein the third lens satisfies:

$$-100 \leq (R_{31}-R_{32})/(R_{31}+R_{32}) \leq 2$$

wherein $R_{31}$ is a radius of curvature of an object side surface of the third lens and $R_{32}$ is a radius of curvature of an image side surface of the third lens.

5. The optical lens assembly as claimed in claim 1, wherein the optical lens assembly satisfies:

$$0.69 \leq f/TTL \leq 0.85$$

wherein f is an effective focal length of the optical lens assembly and TTL is an interval from the convex surface of the first lens to an image plane along the optical axis.

6. The optical lens assembly as claimed in claim 1, wherein the sixth lens is a meniscus lens and comprises a convex surface facing the object side and a concave surface facing the image side.

7. The optical lens assembly as claimed in claim 1, wherein the first lens, second lens, third lens, fourth lens, fifth lens and sixth lens further comprising at least one aspheric surface.

8. The optical lens assembly as claimed in claim 1, further comprising a stop disposed between the object side and the first lens.

9. An optical lens assembly comprising:
a first lens which is with positive refractive power and comprises a convex surface facing an object side;
a second lens which is with refractive power;
a third lens which is with refractive power;
a fourth lens which is a meniscus lens with negative refractive power and comprises a concave surface facing the object side and a convex surface facing an image side;
a fifth lens which is with positive refractive power; and
a sixth lens which is with positive refractive power;
wherein the first lens, the second lens, the third lens, the fourth lens, the fifth lens and the sixth lens are arranged in sequence from the object side to the image side along an optical axis of the optical lens assembly, wherein the optical lens assembly satisfies:

$$-1.8 \leq f_4/f \leq -1.3;$$

$$3 \leq f_6/f \leq 5$$

wherein $f_4$ is an effective focal length of the fourth lens, $f_6$ is an effective focal length of the sixth lens and f is an effective focal length of the optical lens assembly.

10. An optical lens assembly comprising:
a first lens which is with positive refractive power and comprises a convex surface facing an object side;
a second lens which is with refractive power;
a third lens which is with refractive power;
a fourth lens which is a meniscus lens with negative refractive power and comprises a concave surface facing the object side and a convex surface facing an image side;
a fifth lens which is with positive refractive power; and
a sixth lens which is with positive refractive power;
wherein the first lens, the second lens, the third lens, the fourth lens, the fifth lens and the sixth lens are arranged in sequence from the object side to the image side along an optical axis of the optical lens assembly,
wherein the optical lens assembly satisfies:

$$3 \leq f_6/f \leq 5$$

$$0.2 \leq (R_{21}-R_{22})/(R_{21}+R_{22}) \leq 0.4$$

wherein $f_6$ is an effective focal length of the sixth lens, f is an effective focal length of the optical lens assembly, $R_{21}$ is a radius of curvature of an object side surface of the second lens and $R_{22}$ is a radius of curvature of an image side surface of the second lens.

11. An optical lens assembly comprising:
a first lens which is with positive refractive power and comprises a convex surface facing an object side;
a second lens which is with refractive power;
a third lens which is with refractive power;
a fourth lens which is with negative refractive power;
a fifth lens which is with positive refractive power; and
a sixth lens which is with positive refractive power;
wherein the first lens, the second lens, the third lens, the fourth lens, the fifth lens and the sixth lens are arranged in sequence from the object side to an image side along an optical axis of the optical lens assembly,
wherein the optical lens assembly satisfies:

$$5 \leq f_5/f \leq 100;$$

$$3 \leq f_6/f \leq 5$$

wherein $f_5$ is an effective focal length of the fifth lens, $f_6$ is an effective focal length of the sixth lens and f is an effective focal length of the optical lens assembly.

12. An optical lens assembly comprising:
a first lens which is with positive refractive power and comprises a convex surface facing an object side;
a second lens which is a meniscus lens with negative refractive power and comprises a convex surface facing the object side and a concave surface facing an image side;
a third lens which is with refractive power;
a fourth lens which is with negative refractive power;
a fifth lens which is with positive refractive power; and
a sixth lens which is with positive refractive power;
wherein the first lens, the second lens, the third lens, the fourth lens, the fifth lens and the sixth lens are arranged in sequence from the object side to the image side along an optical axis of the optical lens assembly,
wherein the optical lens assembly satisfies:

$$3 \leq f_6/f \leq 5$$

wherein $f_6$ is an effective focal length of the sixth lens and f is an effective focal length of the optical lens assembly.

13. An optical lens assembly comprising:
a first lens which is with positive refractive power and comprises a convex surface facing an object side;
a second lens which is with negative refractive power;
a third lens which is with positive refractive power and comprises a convex surface facing an image side;
a fourth lens which is with negative refractive power;
a fifth lens which is with positive refractive power; and
a sixth lens which is with positive refractive power;
wherein the first lens, the second lens, the third lens, the fourth lens, the fifth lens and the sixth lens are arranged in sequence from the object side to the image side along an optical axis of the optical lens assembly,
wherein the optical lens assembly satisfies:

$$3 \leq f_6/f \leq 5$$

wherein $f_6$ is an effective focal length of the sixth lens and f is an effective focal length of the optical lens assembly.

14. An optical lens assembly comprising:
a first lens which is with positive refractive power and comprises a convex surface facing an object side;
a second lens which is with refractive power;
a third lens which is with refractive power;
a fourth lens which is with negative refractive power;
a fifth lens which is with positive refractive power; and
a sixth lens which is with positive refractive power;
wherein the first lens, the second lens, the third lens, the fourth lens, the fifth lens and the sixth lens are arranged in sequence from the object side to an image side along an optical axis of the optical lens assembly,
wherein the optical lens assembly satisfies:

$$3 \leq f_6/f \leq 5;$$

$$65° \leq \text{field of view} \leq 75°$$

wherein $f_6$ is an effective focal length of the sixth lens and f is an effective focal length of the optical lens assembly.

15. An optical lens assembly comprising:
a first lens which is with positive refractive power and comprises a convex surface facing an object side;
a second lens which is with refractive power;
a third lens which is with refractive power;
a fourth lens which is with negative refractive power;
a fifth lens which is with positive refractive power; and
a sixth lens which is with positive refractive power;
wherein the first lens, the second lens, the third lens, the fourth lens, the fifth lens and the sixth lens are arranged in sequence from the object side to an image side along an optical axis of the optical lens assembly,
wherein the optical lens assembly satisfies:

$$-100 \leq (R_{31}-R_{32})/(R_{31}+R_{32}) \leq 2;$$

$$5 \leq f_5/f \leq 100$$

wherein $R_{31}$ is a radius of curvature of an object side surface of the third lens, $R_{32}$ is a radius of curvature of an image side surface of the third lens, $f_5$ is an effective focal length of the fifth lens and f is an effective focal length of the optical lens assembly.

16. The optical lens assembly as claimed in claim 15, wherein the optical lens assembly satisfies:

$$-1.8 \leq f_4/f \leq -1.3$$

wherein $f_4$ is an effective focal length of the fourth lens and f is an effective focal length of the optical lens assembly.

17. The optical lens assembly as claimed in claim 15, wherein the optical lens assembly satisfies:

$$0.69 \leq f/TTL \leq 0.85$$

wherein f is an effective focal length of the optical lens assembly and TTL is an interval from the convex surface of the first lens to an image plane along the optical axis.

18. The optical lens assembly as claimed in claim 15, wherein a range of field of view satisfies: 65°≤field of view≤75°.

* * * * *